United States Patent [19]

Lavigne et al.

[11] 4,179,817

[45] Dec. 25, 1979

[54] METHOD AND APPARATUS FOR PROVIDING REPEATABLE WIRELINE DEPTH MEASUREMENTS

[75] Inventors: Jean C. Lavigne, Chevreuse; Gérard Ségéral, Orsay, both of France

[73] Assignee: Schlumberger Technology Corporation, New York, N.Y.

[21] Appl. No.: 706,106

[22] Filed: Jul. 16, 1976

[30] Foreign Application Priority Data

Jul. 22, 1975 [FR] France .................................. 75 22778

[51] Int. Cl.² .............................................. G01B 5/04
[52] U.S. Cl. .................................... 33/129; 33/141 R
[58] Field of Search ................. 33/134 R, 134 A, 129, 33/132, 133, 141 R, 141 G, 141.5, 142

[56] References Cited

U.S. PATENT DOCUMENTS

| | | | |
|---|---|---|---|
| 1,739,247 | 12/1929 | Marchev | 33/134 R |
| 2,806,372 | 9/1957 | Arps | 33/134 R |
| 2,987,822 | 6/1961 | Arps | 33/134 R |
| 3,828,437 | 8/1974 | Heselwood | 33/134 R |
| 3,862,497 | 1/1975 | Vernooy et al. | 33/141 G |

*Primary Examiner*—William D. Martin, Jr.

*Attorney, Agent, or Firm*—Kenneth Olsen; Bruce N. Carpenter; Henry N. Garrana

[57] ABSTRACT

A depth measurement system produces independent signals, each presumably corresponding to the same movement of a wireline if produced under ideal wireline measurement conditions. The system utilizes the signals to provide an accurate and repeatable signal under varying wireline measurement conditions and is particularly suitable for driving a recorder for depth recording and merging measurements from tools lowered in the borehole on different runs and to detect slippage between the wireline and a tangential wheel used to provide one of the signals. Slidably mounted measurement wheels insure tangential engagement of opposite sides of the wireline with equal pressure. Low-load signal generators each responsive to the rotation of the opposing wheels provide independent signals, each ideally corresponding to the movement of the wireline engaged between them. Magnetic marks written on the wireline are sensed and provide yet another independent signal. Automatic processing of these signals provides alarms and corrections for slippage, variations in measurement tension, and cable stretch.

28 Claims, 14 Drawing Figures

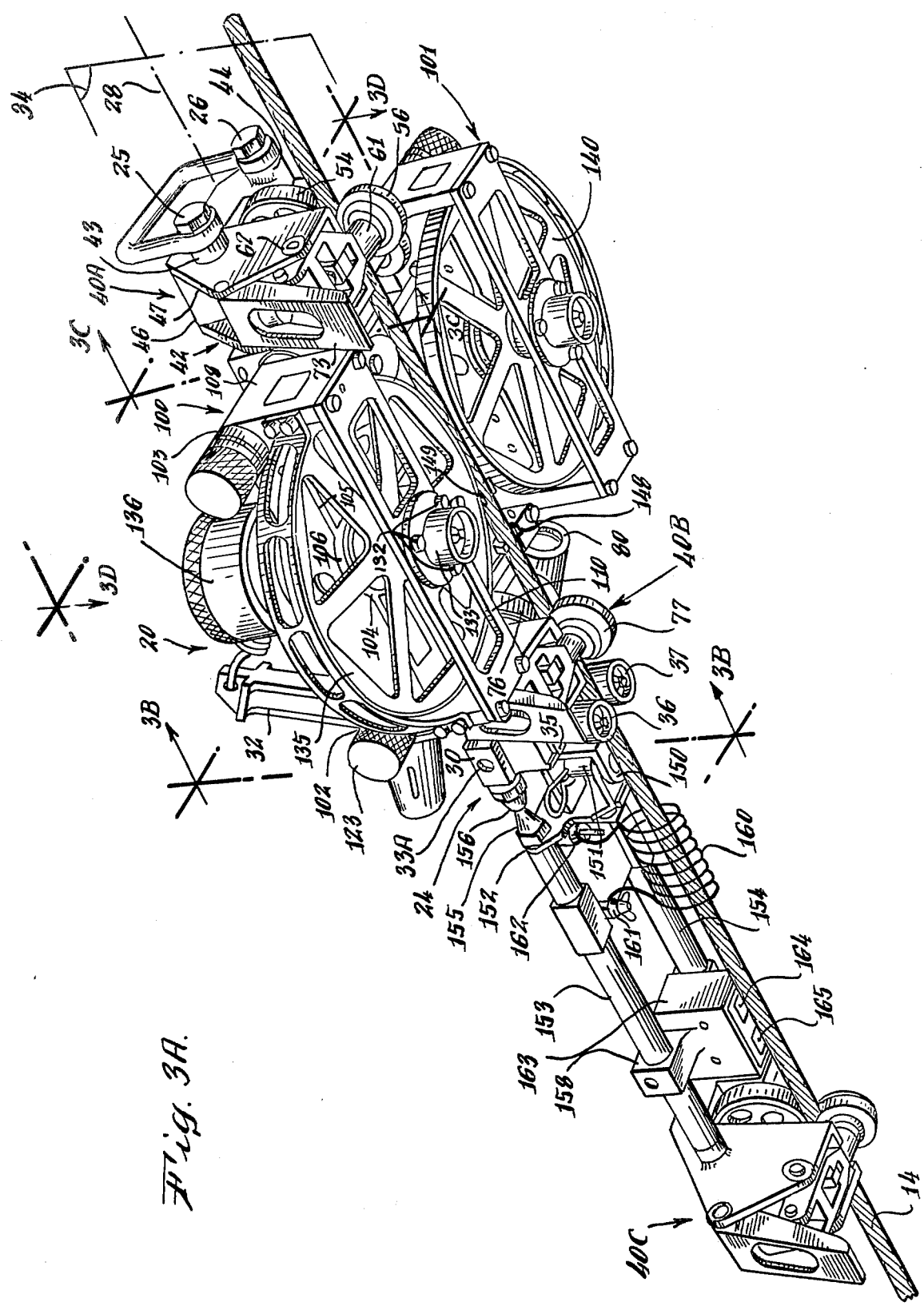

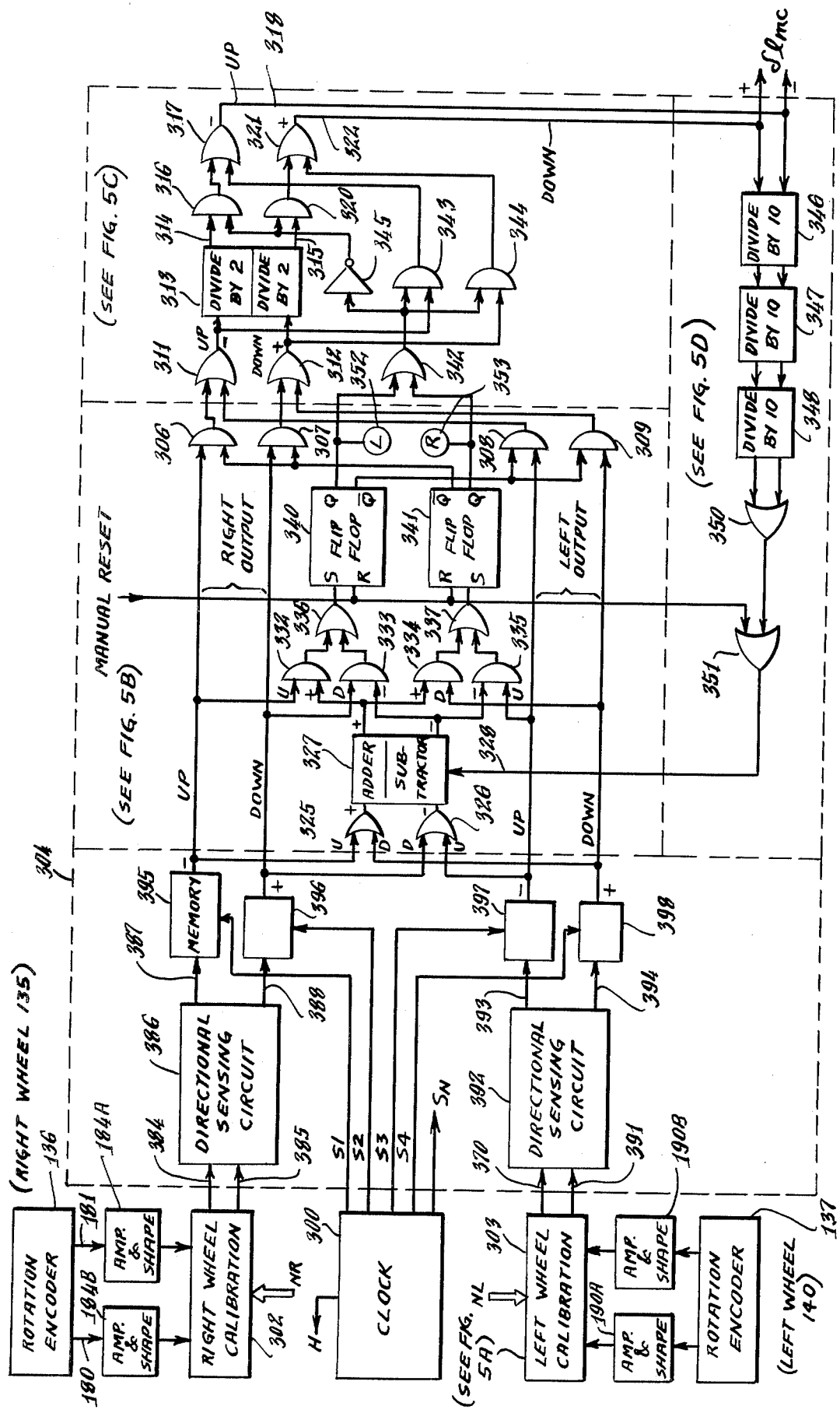

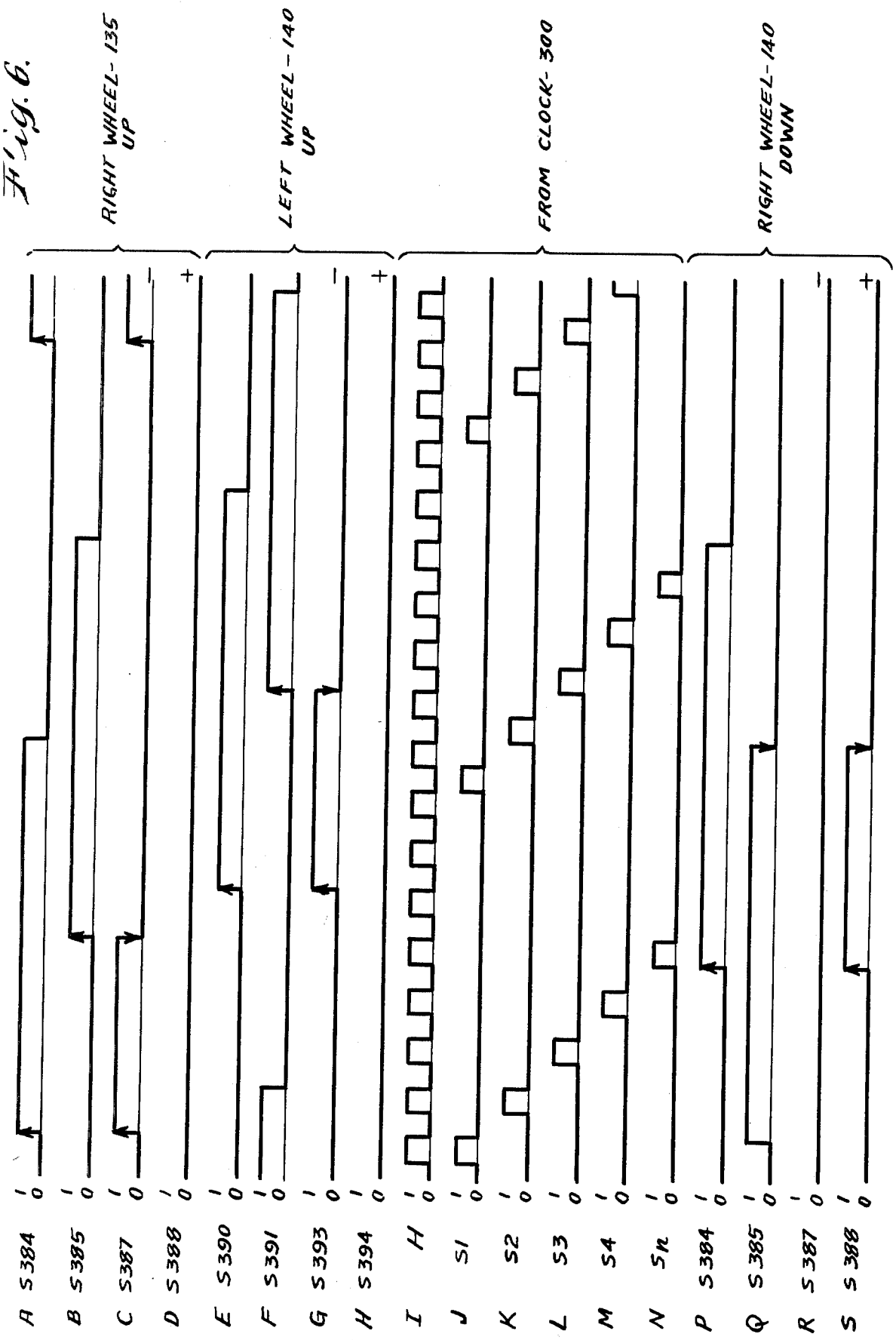

METHOD AND APPARATUS FOR PROVIDING REPEATABLE WIRELINE DEPTH MEASUREMENTS

FIELD OF THE INVENTION

Method and apparatus for providing wireline depth measurements for a borehole tool lowered in the borehole on the wireline and more particularly for providing repeatable depth signals for depth matching and recording measurements made on different wireline runs.

In general, two types of wireline depth measurement systems are used. One employs a calibrated tangential wheel or sheave at the surface, and the other employs marks (usually magnetic) placed on the wireline at known depths or intervals and under known reference conditions. The wheel system will be described first.

The wireline measurement wheel is usually located several tens of feet from the top of the borehole, such as at the point where the wireline is supported above the borehole in a derrick, or between this point and a winch used to spool and store the wireline and run it in and out of the borehole. The placement of the wheel at a point some distance from the top of the borehole is necessary in order to provide room for long borehole tools to be seen as they emerge from the borehole and clear the borehole before encountering the first restriction on the wireline. Further, the measurement wheel usually is located near the winchman's depth counter and recorders used for recording measurements from the borehole tool since the rotation of the wheel may be mechanically linked to drive these devices.

There are several sources of error and varying conditions which lead to poor accuracy and more particularly to lack of repeatability when measurement wheels are used to drive depth counters and recorders. The linkage between the wheel and these devices and the devices themselves place a torque load on the wheel which, under adverse conditions often present at the wheel, cause errors in the depth measurements due to slippage between the wheel and the wireline. Further, changes in the circumference of the wheel due to mud buildup on the wheel, for example, or differences in contact area and variations in the pressure between the wheel and the wireline as the wireline is run in and out of the borehole produce additional instability, uncertainty and inaccuracy to the measurements. As such, systems using a measurement wheel as the only source of depth information are generally unreliable for accurate depth measurements and for driving a recorder for recording measurements from the borehole tool versus depth. This is particularly true when a recording made on one run must be accurately merged at corresponding depths with an additional recording made on another run.

While low torque drives provide improvements, slippage is still a problem since wheel bearings can still fail, and wheel-to-wireline contact pressures vary for a number of reasons and more particularly because slippage may exist undetected for relatively long periods and accumulate sizeable errors before being detected.

Slippage may be detected by an alert and experienced operator noting the apparent depth accumulated by the wheel does not match the depth corresponding to a mark on the wireline known to him, as for example a flag placed on the line on a previous run when the borehole tool is at a known depth. Unfortunately, such flags are too infrequent, often not noticed by a tired operator, or the flag is at a depth too close to the bottom of the borehole such that slippage might accumulate unnoticed and falsely indicate a much too shallow depth, which consequently could allow the borehole tool to unexpectedly impact the bottom of the borehole. Similarly, on the run out of the borehole, accumulated slippage may lead the operator to believe the borehole tool is deeper than indicated which could result in the unexpected surfacing and impacting of the borehole tool with a support sheave and endangering both equipment and personnel.

It is therefore an object of the present invention to provide automatic slippage detection indications to alert the operator and allow for correction before serious errors accumulate.

After correcting the cause of slippage, such as insufficient contact pressure, mud on the wheel, etc., an attempt to correct for the accumulated slippage error may be made by the operator by adding or subtracting the accumulated slippage. Here the operator must be careful to remember the slippage depth correction must be added during the run into the borehole and subtracted during the run out. Where flags or marks are present at close intervals on the wireline, these corrections must be kept current as errors accumulated over several hundred feet may lead to possibility of confusing one mark for another and correcting to the wrong mark. For example, in a magnetic mark depth system where marks are at 100-foot intervals, a 50-foot accumulation of slippage would provide a false depth indication midway between two marks. The operator would have to correctly identify the depth corresponding to these marks by remembering which direction slippage errors would affect the indicated depth and apply the corrections in the proper direction. This direction, of course, differs between the run in and the run out. When the slippage correction is made improperly, as in the above example, it is possible the entire log could be run and recorded 100 feet off the correct depth.

Of course, even when the slippage correction is known and made properly, the indicated depth is correct only at the depth at which the correction is applied. Further slippage corrections are necessary as the borehole tool depth is changed.

It is therefore an additional object of the present invention to provide automatic and continuous corrections for slippage to prevent accumulation of slippage errors and provide an accurate and consistent depth indication at all times during the run into and out of the borehole.

One varying condition associated with measurement wheels is the accuracy and stability of their circumference during the logging operation. Since each rotation of the wheel corresponds to an elemental length of the wireline, even a small error in this length accumulates on each rotation and can lead to large errors with problems similar to those described above for slippage. However, unlike the direction of the slippage error, the direction of the circumference variation errors may not be predictable, as the circumference may be either too large as, for example, increased through layers of mud packed on its surface, or too small, as decreased by wear. Further, extremes of operating temperatures may produce circumferences which are either too large or too small for the same wheel.

While the use of wheels made of material such as INVAR, which have low temperature expansion coefficients, has somewhat minimized the circumferential variation of wheels due to temperature variations, manufacturing tolerances and wear prevent all wheels from having an exact standard circumference. The wheels could be made adjustable, but then they must be segmented and the segmenting creates new problems.

Despite strict manufacturing control, operators learn from experience or calibration runs that one particular wheel is too large and another is too small. The operator then attempts to correct for each wheel variance, adding for one wheel while subtracting for another. The correction is one way while going in the borehole and the reverse while coming out. Further, operators tend to let the correction accumulate for long intervals such as several thousand feet and then enter the correction at one time. If corrections are to be done consistently, both the direction and degree of each correction and the correction depth must be noted and repeated for each run. Still further, if a substantial time lapses between runs, different operators and even equipment may make different runs. Needless to say, confusion can result and errors are likely.

Therefore, it is a further object of this invention to provide automatic and continuous corrections for a variance of a given wheel from an established standard for such wheels.

Even if wheel variance corrections are conscientiously applied both correctly and consistently, there are circumstances where the depth measurements from one wheel will randomly vary from another, at least for a short period, and not correspond exactly to the movement of the wireline. For example, if material adheres to the tangential surface of the wheel, it will temporarily increase the diameter of the wheel at that point until pressed off, perhaps several rotations later. Also, material may temporarily adhere to points preferentially along one side of the wireline, as for example, a water drop occasionally clinging to and freezing on the bottom side of the wireline. These random bumps will artificially increase the path length of a wheel traveling over that side of the wireline such that the rotation of the wheel will not correspond temporarily to the wireline movement.

With only one source of depth information available during a given run, there is little way the above sort of random variation can be detected. Further, since the condition only exists on a temporary basis, even if detected, it is not clear how the operator could provide an immediate and appropriate compensation.

Therefore, it is a still further object of the present invention to produce at least two signals, each corresponding at least under ideal measurement conditions to the wireline movement and a means for utilizing these signals to automatically provide a compensation for such random variations.

Operational conditions associated with logging of a borehole render many industrial measurement devices impractical for well logging. One of these conditions is the necessity to repeatedly spool the wireline on a winch so that it may be stored between runs and transported from well to well. Spooling must be accomplished in an orderly manner such that wireline crushing loads or variations in tension do not result at any point which might lead to distorting or breaking insulation or electrical conductors contained within the wireline. To facilitate the spooling, a winch operator operates a mechanical spooling arm which engages the wireline and guides it along a selected winding pattern as it is spooled on the winch to facilitate neatly spooling the wireline.

It is preferred that the measurement wheel be located in the proximity of the winch because the winch operator can then observe the action of the wheel. Unfortunately, varying conditions are usually extreme in the proximity of the spooling arm. Both the spooling action, particularly at breaks in the spooling pattern near edge flanges on the winch, and variations in wireline tension caused by wireline and borehole tool drag on the side of the borehole, produce wide variations in lateral and vertical forces on the wireline as it is run in and out of the borehole. It is known that measurement wheel measurements vary when such external forces are exerted on them changing the contact pressure and area and perhaps even distorting the shape of the wireline and/or the wheel.

Variations in the contact area are important, since this varies the distribution of the pressure between the wireline and the wheel. A wheel having the wireline contact area one-half its circumference, as does the support sheave, will vary its measurements from an identical wheel having wireline contact only around one-fourth its circumference, as is typical of an alignment sheave, and will vary considerably from a wheel having a tangential contact. Thus, one requirement for accurate wireline measurements under well logging conditions is the placement of the measuring wheel at a point on the wireline where the contact area will not vary and where contact forces are not sufficient to distort either the wireline or the wheel.

Possible placement points are limited because, as previously mentioned, adequate clearance must be provided for the borehole tool at the top of the borehole. Thus, for example, the wireline measuring wheel system used in wireline drilling and disclosed in U.S. Pat. No. 1,768,809 would not provide the required clearance because it requires two wheels on opposite sides of a vertical section of the wireline present at the top of the borehole. The patent is of interest in that it shows two separate depth registers, one for each wheel, one register to serve as a check on the other or to be used in the event one register became unserviceable.

One approach to prevent slippage under industrial conditions rather than well logging conditions is described in U.S. Pat. No. 3,828,437, issued Aug. 13, 1974 to J. C. Heselwood. A pair of opposing endless belts are held in frictional contact along the wireline. Each belt is operatively connected to a differential such that the drive load is shared between the belts. The output shaft of the differential actuates a digital counter device. While this device may be suitable for measuring newly manufactured wirelines under industrial conditions where variations in factors such as tension, temperature, weather and alignment may be carefully controlled, and no mud is present to fowl the belts, there is little assurance such a device would work under well logging conditions and on wirelines in various states of cleanliness, age and corrosion. Further, such devices are not required to drive a recorder in correspondence with the movement of the wireline.

It is therefore a still additional object of the present invention to provide method and apparatus for providing signal representative of the movement of a wireline used for lowering a borehole tool in a borehole under varying wireline measurement conditions, with the signal being suitable for driving a recorder to move in correspondence with the wireline movement.

The type of accuracy of wireline length measurements required by industry in selling new wireline or in cable tool drilling to roughly determine the depth of a borehole is somewhat less demanding than depth measurement requirements for well logging. Further, in industrial and drilling operations, there is little need for repeatable measurements. In well logging, the necessity for repeatable depth measurements is now more important than ever, not just because boreholes are deeper, but additionally because more runs are being made on each borehole and measurements for each run must be accurately depth merged with one another to enable processing via computer. In such merging and processing, it is important that measurements obtained from a given point in a borehole on one run be merged accurately with all additional measurements obtained from the same point on other runs. For this to be done, the depth signals used to drive the recorder on each run must be highly repeatable, not only so starting points of each recording correspond, but also so that the same number of samples be produced as a function of the depth signals on each run between any two points along the borehole.

It is therefore an object of the present invention to provide method and apparatus for providing a repeatable signal suitable for driving a recorder for depth recording measurements from different runs in and out of the borehole, such that these measurements can be accurately depth merged. Depth recording as used herein, is defined as recording measurements obtained from a borehole tool in correspondence with a depth indication for the tool derived from wireline measurements. By example, measurements obtained from the tool may be sampled and recorded at fixed increments of depth or wireline movement with the depth of at least one sample known and therefore the depths of all other samples readily computable. By further example, measurement from the tool may be obtained at fixed or random times, and recorded along with the depth indication for the tool at that time.

SUMMARY OF THE INVENTION

Accordingly, method and apparatus are described for providing a repeatable signal representative of movement of a wireline under varying wireline measurement conditions. This repeatable signal is particularly suitable for driving a recorder used for depth recording measurements from a borehole tool lowered in a borehole on the wireline. Accurate depth merging of measurements recorded from different borehole tool runs can be accomplished despite variations in wireline measurement conditions which typically produce slippage of mechanically coupled measurement devices.

In one embodiment, independent signals are produced, each corresponding to the wireline movement at generally the same point on the wireline. These signals presumably correspond to the same movement of the wireline if produced under ideal measurement conditions. However, when wireline measurement conditions vary, it can be presumed that one of the signals may deteriorate and not correspond to or repeat with the movement of the wireline. Accordingly, the signals are automatically utilized to provide a repeatable signal representative of the wireline movement even when wireline measurement conditions are less than ideal.

In one form of the invention independent signals are produced from substantially identical wireline measurement wheels tangentially coupled to the wireline in substantially the same manner for rotation of the wheels with movement of the wireline. Low torque-load signal generators each responsive to the rotation of one wheel are used for generating the independent signals corresponding to the rotation.

Additional features of the invention comprise slidable and pivotally mounted carriages for supporting the wheels and the utilizing of the independent signals corresponding to their rotation.

The wheel support carriages are slidably mounted on opposite sides of a chassis and provide for a slidable movement of the carriages along two substantially parallel lines transverse to the direction of the wireline movement. Carriages and mounts define a rotation plane for the wheels which is generally parallel to a plane including these two parallel lines. Wheels on opposite sides of the chassis are equally biased to slide towards each other and tangentially engage opposite sides of the wireline between them. The biasing is opposed and balanced between the wheels and mechanically couples in substantially the same manner the wireline movement to rotate the wheels. The slidable mounts and carriages are pivotally supported on the chassis and align the rotational plane of the wheels to include the path of the wireline; the slidable mounted carriages, biasing of the wheels and pivotal supports cooperating to yield to unbalanced lateral forces exerted on the wheels. Otherwise, lateral forces, such as for example, those forces used to spool the wireline, might be exerted on one of the wheels, varying the contact force and tangential bearing area, causing the measurement wheels to differ in their rotational response.

Features of the invention utilizing independent signals corresponding to the rotation of the wheels comprise, in one form, comparing the independent signals to determine which signal corresponds to the more rapidly rotating wheel. One wheel appearing to be more rapidly rotating than another wheel is an indication that the less rapidly rotating wheel may be slipping or otherwise operating in an irregular manner, and cannot be expected to repeat. Accordingly, the signal corresponding to the more rapidly rotating wheel is selected as the repeatable signal. Additional features provide for indicating the apparently slipping wheel to alert the operator so that appropriate action may then be taken.

Where the comparison finds the signals differ only by a small percentage indicating each wheel is operating under substantially the same wireline measurement conditions, the signals are automatically averaged to provide a more repeatable signal. Where the difference between the signals is more than a small percentage, an automatic selection of the signal from the apparently more rapidly rotating wheel provides the repeatable signal.

It should be understood that a slipping wheel indication does not necessarily mean the wheel is actually slipping but may mean other factors having the same result may be present such as a faulty linkage between the wheel and an encoder used to generate the signals or faulty electronics or connections associated with the encoder causing some loss of signal.

For a better understanding of the present invention together with other and further objects thereof, reference is made to the following description taken in con-

BRIEF DESCRIPTION OF THE FIGURES

FIG. 3A is a perspective view of apparatus for providing signals corresponding to wireline movement in accordance with one feature of the invention.

FIG. 4 illustrates circuit diagrams for method and apparatus in accordance with the invention.

FIG. 6 shows a timing diagram; and

DESCRIPTION OF THE PREFERRED EMBODIMENT

Figure 1B:
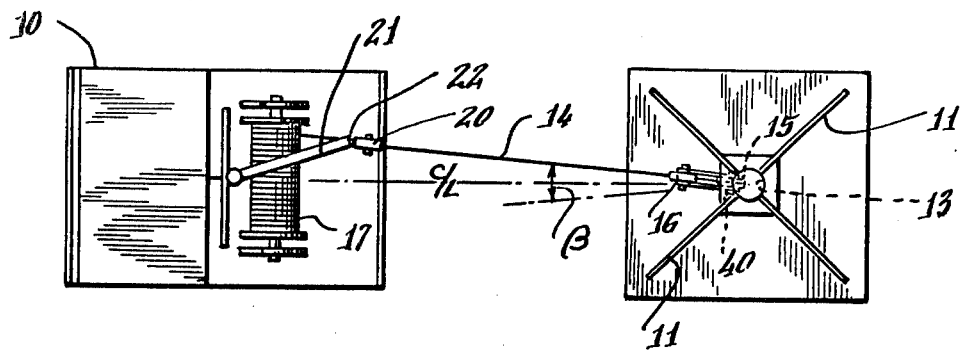
FIG. 1A shows a side view and FIG. 1B a top view of a typical well site set up for depth recorder, wireline spooling, measuring wheel, support and alignment sheaves and borehole tool.
Figure 1A:
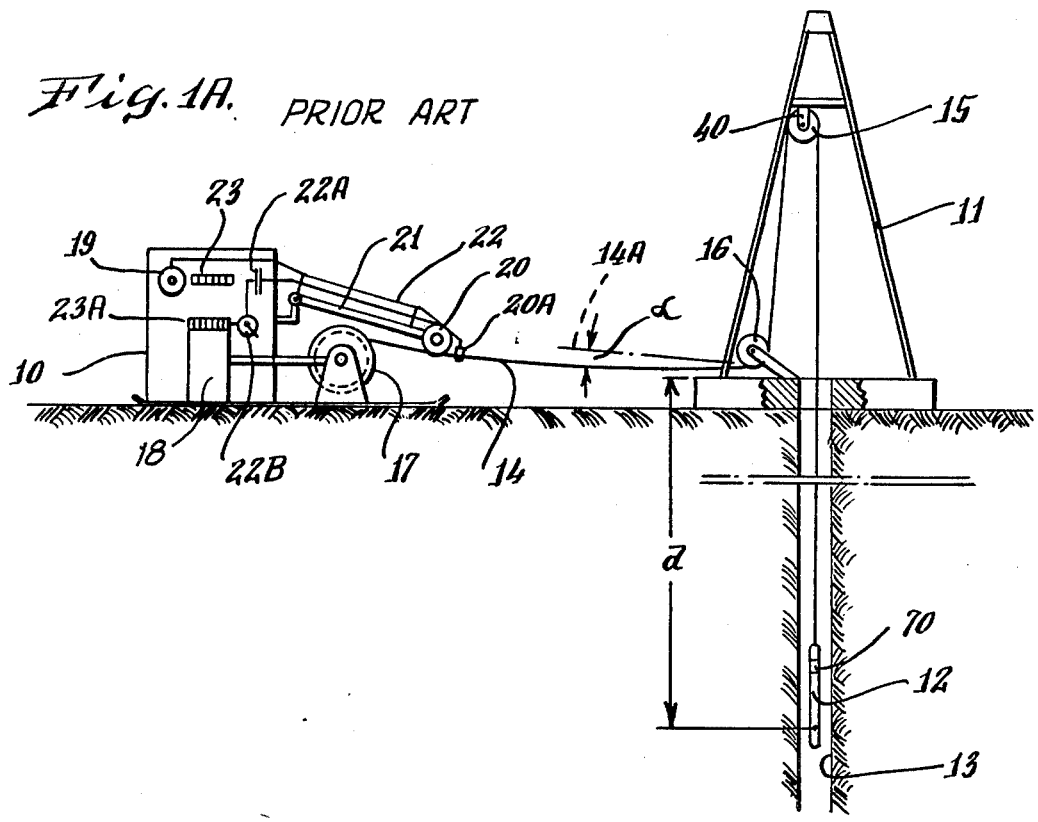

Referring now to FIG. 1A, there is shown a mobile laboratory unit 10 set up near a derrick 11 to lower a borehole tool 12 into a borehole 13 on the end of a wireline 14. The borehole tool 12 may be, for example, a logging sonde for investigating the formations traversed by borehole 13. The wireline 14 from which the borehole tool 12 is suspended runs over a support sheave 15 suspended from the derrick 11 and over a bottom sheave 16 aligned with a winch 17 mounted on unit 10. While in use during logging, the wireline is guided on and off the winch 17 by spooling arm 21 arranged over winch 17. To measure the depth of borehole tool 13, wireline movement on the surface is measured by means of a detection device 20 mounted at the end of spooling arm 21. The detection device 20 is guided along the wireline as the spooling arm swivels laterally to guide the wireline spooling, as can be seen from the top view in FIG. 1B.

The wireline detection device 20 shown in FIGS. 1A and 1B is of a well-known type. A measurement wheel 20 rides along the top of the wireline 14, its weight and perhaps additional pinch wheels, not shown, mechanically couple the wheel to the top side of the wireline. A mechanical linkage 22 couples its rotation through a clutch 22A to a mechanical depth indicator 23 and perhaps to a recorder 18. A hand crank 22B in the linkage allows adjustment of depth at indicator 23 and at a recorder depth indicator 23A. Recorder 18 is electrically connected to conductors in the wireline through sliprings collector on winch 17.

In some cases, magnetic marks previously placed on the wireline at regular intervals, such as every 100 feet, may be detected at magnetic mark detector 20A, and electrically connected to a mark indicator 19, usually in the form of a bell. Placement and use of these marks is described in U.S. Pat. No. 3,566,478 issued to D. F. Hurlston on Mar. 2, 1971.

Briefly, while running the wireline in and out of the borehole, an operator is expected to maintain the same lower significant digits; i.e., ones and tens digits, on indicator 23 by adjusting hand crank 22B when a magnetic mark is indicated. This manual adjustment thereby corrects for slippage of wheel 20 occurring between these detected marks. As already discussed, if slippage is excessive or allowed to accumulate over several mark intervals, it is possible for the operator to confuse one mark for another and make the adjustment incorrectly.

It is well known that varying wireline measurement conditions, such as mud coating on the wireline or the measurement wheel case wheel slippage on the wireline and affect the wheel measurement. However, it is now recognized that curvature of the wireline path at the point of measurement also affects the measurement. Further, changes in the wheel-to-wireline contact pressure cause small, short-term variations. A curved path, as shown in FIG. 1A by an angle $\alpha$, may result from sag in wireline 14 between winch 17 and lower sheave 16 during periods of low wireline tension. Changes in tension tend to accelerate the wireline and measurement wheel in a vertical plane and change the degree of curvature as well as bounce the measurement wheel 20 on the wireline.

As shown in FIG. 1B, the spooling of the wireline 14 on winch 17 also causes wireline path curvature and acceleration forces. During spooling, spooling arm 21 swivels laterally across winch 17, forcing the proper placement of wireline 14 on winch 17. Considerable lateral forces are required to deflect the wireline at an angle $\beta$, shown in FIG. 1B, from a center line. These forces are extreme when the wireline is held against the flanges of the winch in order to start each new layer. Since these lateral spooling forces are applied at the end of the spooling arm 21, the wireline path can be expected to curve at the point where the force is applied.

As previously discussed, many of these problems could be avoided by using the vertical section of wireline just above the top of the borehole, if it were not for the borehole tool clearance requirements associated with well logging. However, in accordance with this invention, these problems are overcome while still meeting this requirement and providing the advantages of operator visibility and short recorder linkages in having the measurement device at the end of spooling arm 21.

Figure 2:
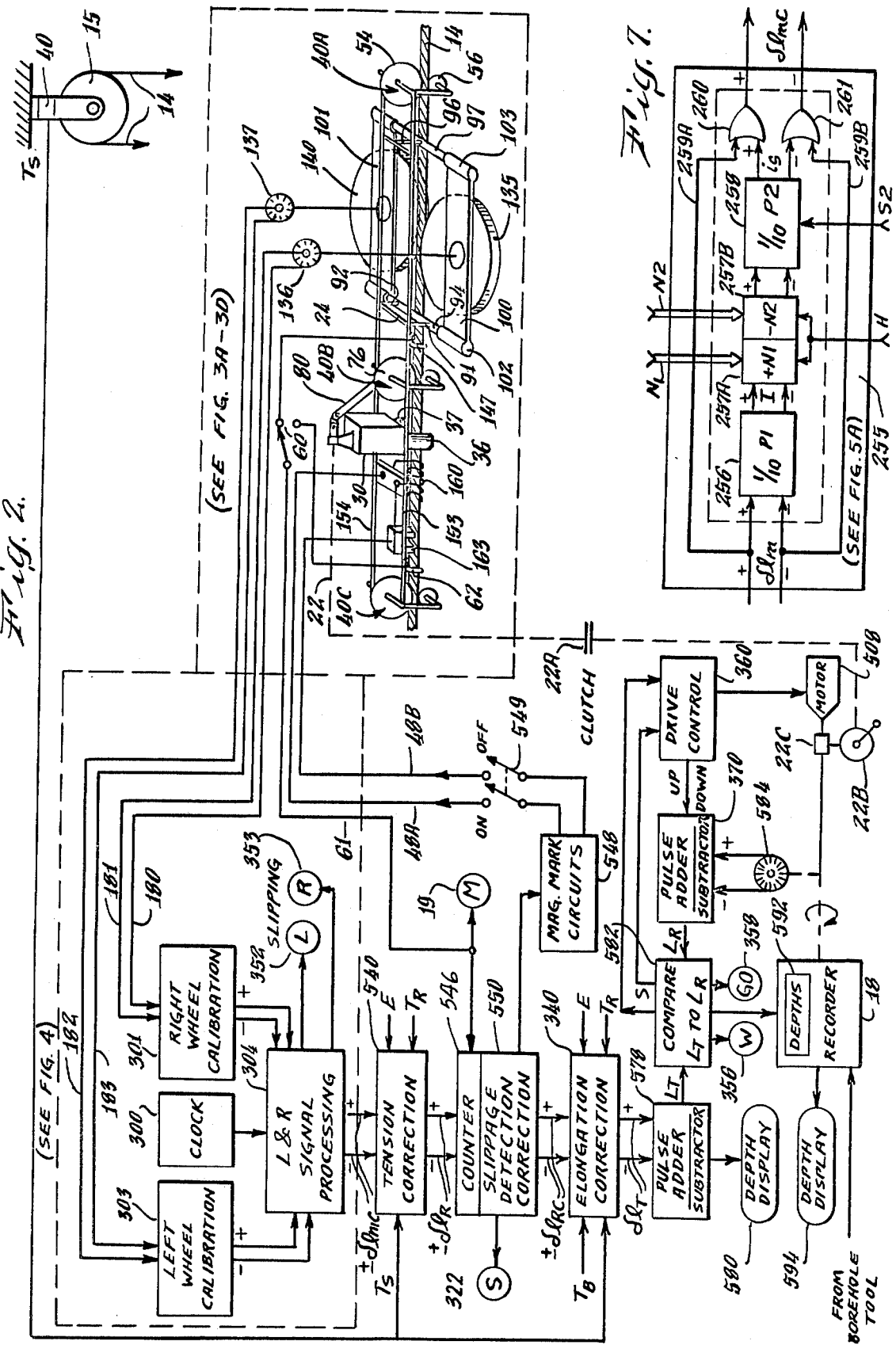
FIG. 2 shows a schematic representation of the wireline depth measurement system of the present invention.

Referring now to FIG. 2, there is shown in schematic form some features of the present invention and how they may be integrated into a depth measurement system. In contrast to the single wheel 20 of the prior art riding on top of wireline 14 as shown in FIG. 1A, substantially identical wheels 135 and 140 are employed on opposite sides of the wireline. As seen by the operator behind winch 17, wheel 135 is the right wheel and 140 the left wheel. Wheel 135 is rotatably supported on carriage 100 and wheel 140 on carriage 101. Carriages 100 and 101 are slidably mounted on tubular mounts 94 and 97, which in turn are pivotally supported on chassis 24 at 91 and 92 for mount 94 and at 96 for mount 97. These mounts align wheels 135 and 140 and define their rotational plane to include the path of the wireline at a point between the wheels. The detailed construction of these carriages, mounts, chassis and wheels may be seen in FIGS. 3A through 3D which will be described later.

Figure 3B:
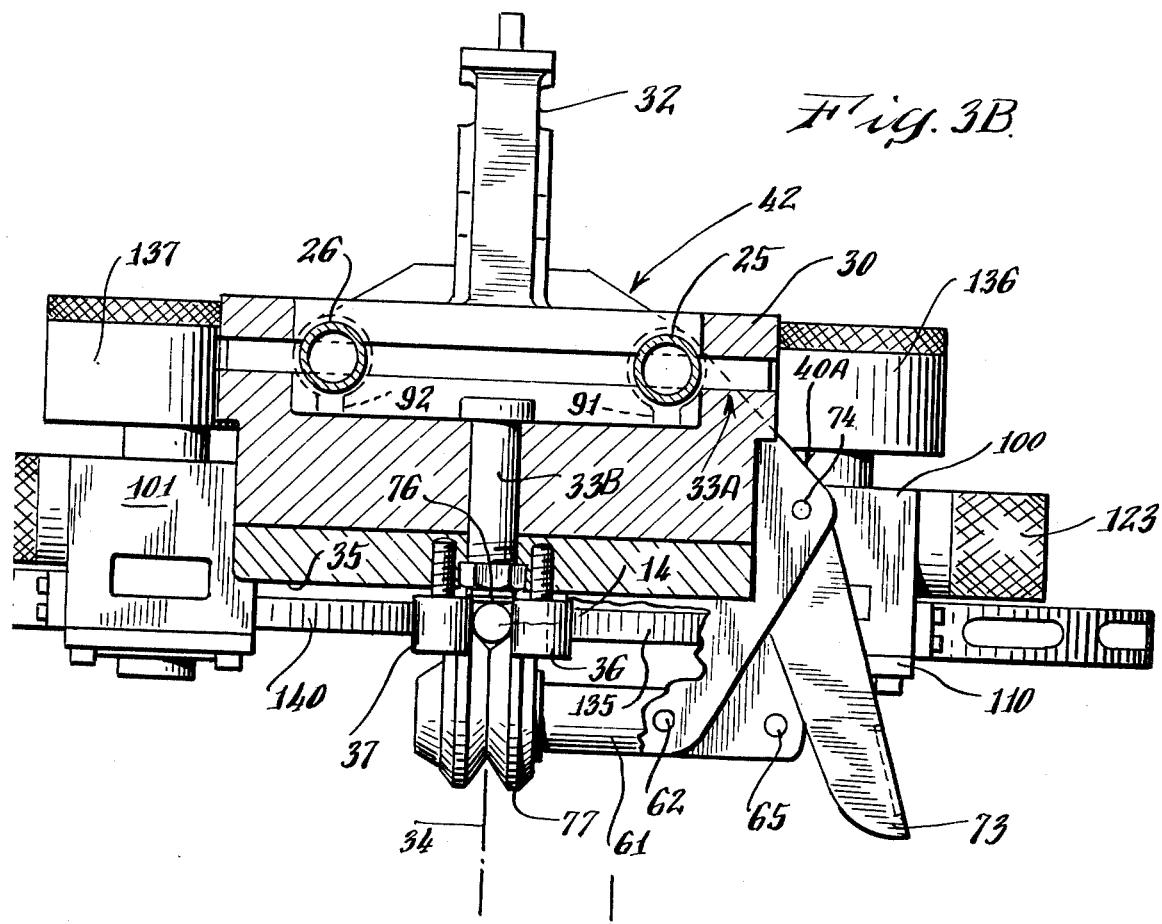
FIGS. 3B and 3C are cross-sections of part of the apparatus of FIG. 3A.
Figure 3C:
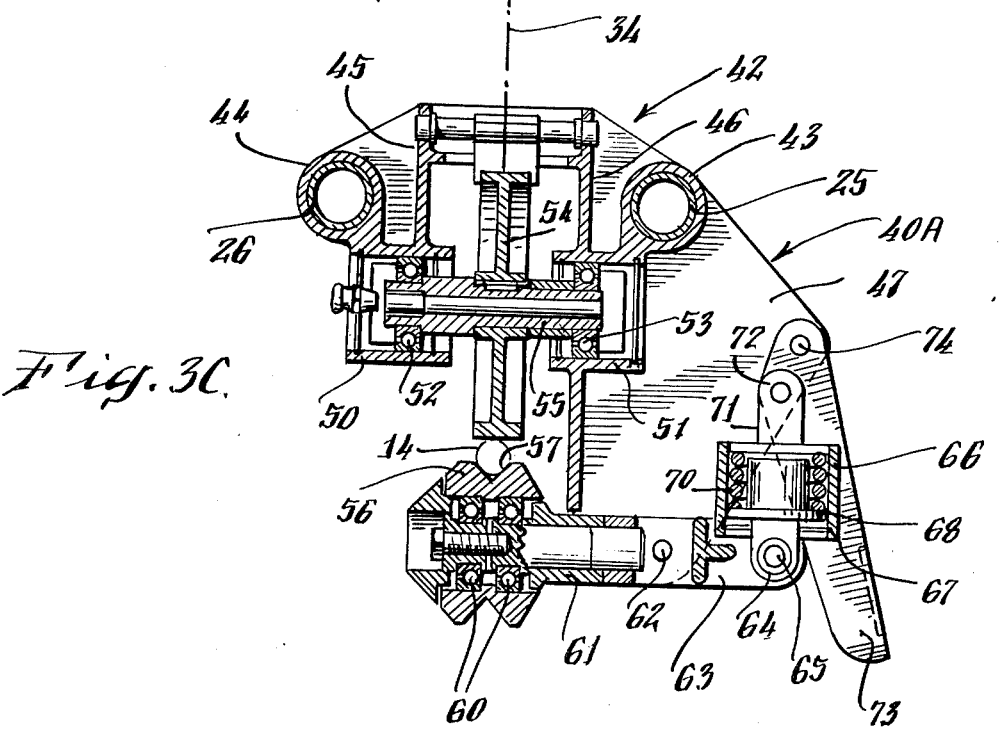
Figure 3D:
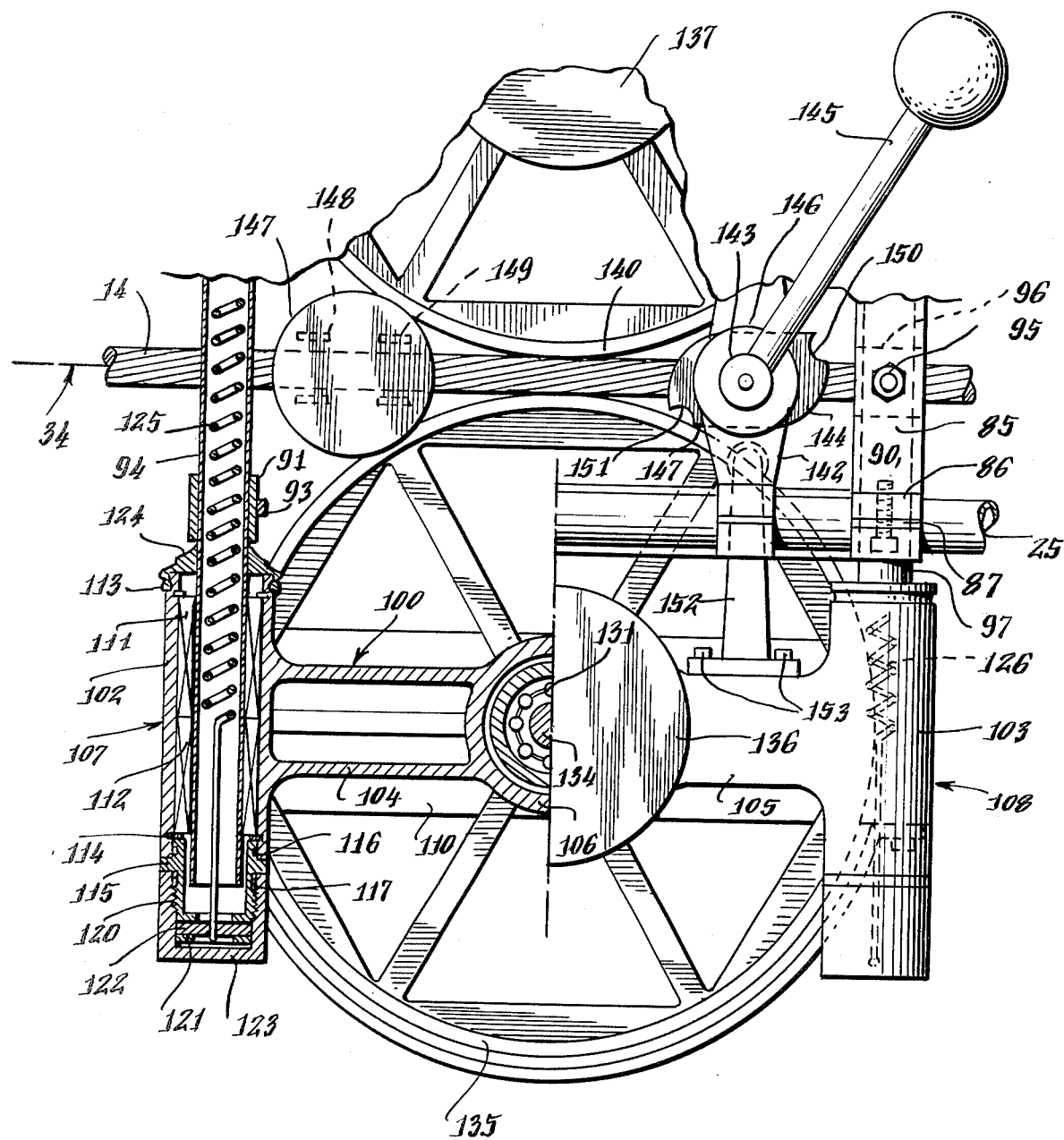
FIG. 3D is a top view, in partial section, of part of the apparatus of FIG. 3A.

Biasing springs visible only in sectional FIG. 3D are contained in mounts 94 and 97 to bias carriages 100 and 101 and wheels 135 and 140 respectively supported thereon equally towards each other, the carriages sliding on mounts 94 and 97, which are parallel and aligned transverse to the direction of movement for wireline 14. In this manner, both wheels 135 and 140 are tangentially coupled to opposite sides of wireline 14 at the same point on the wireline. Since the presence of the wireline between the wheels stops the sliding of the wheels toward each other, the biasing forces balance and clamp the wireline between them. This assures the same wheel-to-wireline contact pressure for each wheel. Further, since each wheel rotates in substantially the same horizontal plane, this eliminates the weight of the wheels as a contact pressure factor. Further, the vertical acceleration on the wireline due to changing tension, as previously discussed, will not affect the contact pressure of either wheel. The combined results are that each wheel is coupled for rotation to the wireline in substantially the same manner.

A chassis 24 is supported and guided on wireline 14 by sets of guide wheel assemblies 40A, 40B and 40C and prevented from rotation or movement along wireline 14 by connections to spooling arm 21 at block 30. The chassis 24 in turn pivotally supports mounts 94 and 97 upon which the carriages slide. This arrangement prevents most lateral spooling forces being transferred from spooling arm 21 from being exerted on wheels 135 and 140. The details of these pivotal supports will be described later.

Lateral spooling forces transmitted from spooling arm 21 to block 30 are applied to wireline 14 by two vertical guide rollers 36 and 37. Common to a plane including rollers 36 and 37 is a vertical pivot, not shown in FIG. 2, but detailed in sectional drawing FIG. 3B. This pivot allows chassis 24 to swivel and align itself along wireline 14 as guided by guide wheel assemblies 40A through 40C. Since lateral spooling forces will be exerted on the wireline at rollers 36 and 37, which are on one side of guide assembly 40B and measuring wheels 135 and 140 are on the other side, there will be little curvature of the wireline at these wheels. Further, as will be appreciated from FIGS. 3A through 3D and the description provided later in regard to these figures, the pivotal nature of supports for mount 94 at 91 and 92 and mount 97 at 96 to chassis 24, slidably mounted carriages 100 and 101 and biasing means included in these mounts cooperate to yield to any unbalanced lateral forces at the wheels. Both wheels simply slide to one side on the slidable mounts in response to any unbalanced lateral force; i.e., a force applied on one wheel and not on the other. This sliding relieves any unequal or unbalanced force and maintains the normal self-balancing biasing forces. Since no unbalanced forces are possible and only the controlled biasing forces can be exerted on the wireline by the wheels, wireline measurement conditions are produced, which allow either wheel to provide a repeatable signal representative of movement of the wireline between the wheels.

Two low-torque signal generators 136 and 137 responsive to the rotation of measurement wheels 135 and 140 respectively produce two signals each corresponding to wireline movement at the point between the wheels. These signals presumably would correspond to the same movement of the wireline, at least under ideal wireline measurement conditions. However, as previously discussed, there are random and short period variations of wireline measurement conditions which would not be detected by the most alert operator. For example, even substantial slippage errors from one of the wheels would not be noticed until a magnetic mark was detected. Only then could the slippage be corrected by the usual hand crank adjustment. Since such a correction is made manually, some time after it occurs, and since it is unlikely that the same slippage will occur at the same depth on each run, manually corrected depth measurement signals cannot be expected to repeat. Not only will the slippage between each magnetic mark interval vary from run to run, but the method of applying the correction may vary for each interval and even for corresponding intervals on different runs. Therefore, in order to provide repeatable depth measurement signals, it is important to automatically and systematically detect slippage as it occurs as provided by this invention. It is also important to take appropriate and immediate corrective action as provided by a further feature of this invention. However, it will now be necessary to review briefly the nature of optical encoders used as low-torque signal generators in conjunction with directional sensing circuits.

As shown in FIG. 2, such an encoder may be used in conjunction with either wheel 135 or 140 as shown at 136 and 137. Each encoder generates two channels of signals such as described in the above Hurlston patent and as illustrated by lines 180 and 181 for signal generator 136 which responds to the rotation of the right wheel 135 as shown in FIG. 2. As described in the above patent, the relationship between these two channels enables the determination of the direction of rotation and output of a single series of pulses. It will be appreciated that these series of pulses may be directed to separate outputs and appear as negative pulses when the wheel is rotated corresponding to decreasing depths as for example, when the wireline is moving out of the borehole, or as positive pulses when the wireline is running in the borehole. Signal generators of this type are well known and typically provide pulses corresponding to one-half inch increments of the measuring wheel circumference.

Figure 7:
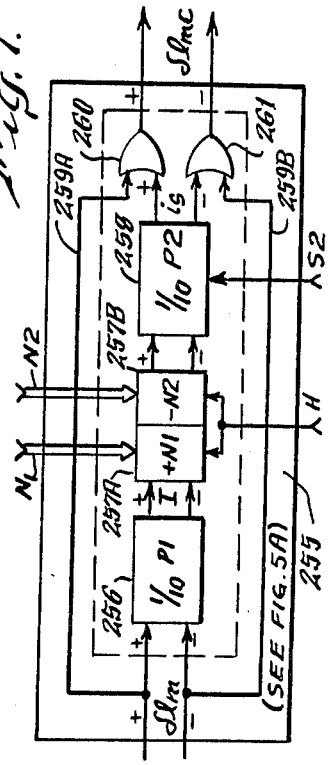
FIG. 7 shows a correction circuit corresponding to the circuits illustrated in FIG. 4.

Due to manufacturing problems, it is unlikely that any two measurement wheels can be made to be exactly identical. It is less costly, and therefore more practical, to provide for electronically calibrating each wheel to a desired standard, particularly since it is a straightforward process to determine the calibration factors required to bring the wheel to this standard. Therefore, as shown in FIG. 2 at block 301, a correction circuit such as shown in FIG. 7 to be described later is employed to calibrate the wheel to this desired standard. A corresponding calibration circuit is shown for the left wheel 140 at 303. After such individual calibration, the signals corresponding to rotation of wheels 135 and 140 presumably correspond to the same movement of the wireline under ideal conditions. Of course, it is understood that, if conditions deteriorate from ideal such that slippage of one of the wheels occurs, these signals will not correspond. Accordingly, it is a feature of this invention to automatically utilize these two signals to provide the most repeatable signal representative of the wireline movement when wireline measurement conditions are less than ideal.

As shown in FIG. 2, two signal generators 136 and 137 responsive to the rotation of measurement wheels 135 and 140, respectively, produce two signals each corresponding to the wireline movement at a point between the wheels. If desired, these signals are calibrated to correct for differences between the wheels and a desired standard. These signals are automatically utilized to provide further features of the invention.

Accordingly, and as shown at block 304 in FIG. 2 and detailed in FIGS. 4 through 6, independent left and right measurement signals are processed to see if they compare. If they agree within a small percentage, it is an indication that both wheels are operating under similar and repeatable wireline measurement conditions. In this case, the measurements may be simply averaged. If, however, one wheel appears to be rotating faster than the other, the less rapidly rotating wheel may be slipping and cannot be expected to repeat. An appropriate indicator 352 or 353, as shown in FIG. 2, is then activated to alert the operator that the corresponding wheel is slipping. Further features provide for automatically selecting the faster rotating measurement wheel as the repeatable measurement. The details of these features are shown in FIGS. 4 through 6.

Referring again to FIG. 2, a general description of how repeatable depth signals may be utilized will be given now. As described in co-pending application Ser. No. 706,105 filed July 16, 1976. by J. H. Guignard, et al., co-filed with the present application, $\pm \delta l_{mc}$ pulses corresponding to small increments of wireline movement (plus for increasing depths going in the borehole, and minus for decreasing depths coming out) are corrected for differences in tension between the actual tension measured at 40 just above support sheave 15, and a desired reference tension $T_R$ according to well known relations utilizing an elastic coefficient E for the particular wireline. This provides increments corresponding to wireline movement as it would be measured under the known reference conditions at the surface and produces signals corresponding to $\pm \delta l_R$ shown as output of block 540 of FIG. 2.

Magnetic marks previously placed on the wireline may be detected at 20A or alternatively at 147 as shown in FIG. 2 and connected to activate mark indicator 19 in the usual manner. However, these marks may also be used to control the accumulation in counter 546 of the $\pm \delta l_R$ pulses output from block 540. In this manner, the number of pulses corresponding to the interval between each magnetic mark is accumulated and compared with the number normally expected. A deficiency in $\delta l_R$ increments corresponds to slippage of a mechanically coupled wheel as compared to the magnetic marks and can be detected as shown at 550 and indicated at 332. Deficient $\delta l_R$ increments can also be added to the existing $\pm \delta l_R$ pulses to provide automatic slippage corrected pulses $\pm \delta l_{Rc}$.

Magnetic marks may be placed on the wireline using the above $\delta l_R$ pulses input to block 550 of FIG. 2 by accumulating the pulses until the number corresponding to the interval between magnetic marks is obtained. Then the magnetic marking circuit 548 is triggered. When switch 549 is in the ON position, electromagnet 163 will be pulsed to place a magnetic mark at that point on the wireline which has been previously erased by solenoid 160. Where no reliance can be placed on old marks or none exist, as during initial marking, no protection for slippage can be provided as described above by counting the number of movement increments between previously installed magnetic mark intervals. Consequently, it is important to have a reliable and slip-protected mechanical measuring system such as the force balancing wheel system of the present invention.

After further correction for elongation of the wireline between the surface and the borehole tool due to the tension $T_B$ caused by the weight of the wireline tool as shown at block 340 of FIG. 2, pulse signals are added during descent and subtracted during raising of the borehole tool to provide its depth as indicated at block 580 of FIG. 2 or compared at block 582 to similar incremental pulses from recorder 18 to synchronize the recorder depth 594 with the borehole tool depth. Also shown at FIG. 2 is a mechanical backup system 80 much as described in regard to FIG. 1A consisting of measuring wheel 76 in guide wheel assembly 40B and mechanical linkage 22 which may be coupled by means of clutch 22A and hand crank 22B to mechanically drive recorder 18. Since this system is entirely mechanical, it could be used in case of a failure such as a complete lack of electrical power. Now that the utilization of depth measurements has been generally described, a detailed description of the measurement wheel assembly will be provided.

Referring to FIG. 3A, where is shown a chassis 24 made up of two parallel longitudinal rods 25 and 26, each having its rear end fixed to block 30. A longitudinal axis for the chassis is defined by line 28 parallel to rods 25 and 26 located midway between these rods. Block 30 is mounted via universal joint not seen in FIG. 3A but shown in detail in FIG. 3B at the lower end of bracket 32 and fixed through its middle to pivot on spooling arm 21. The universal joint comprises, in a conventional manner, a crosspiece having a first pivot 33A shown in FIGS. 3A and 3B mounted rotatably in a bore provided in block 30 perpendicular to rods 25 and 26 and a second pivot 33B shown only in FIG. 3B mounted rotatably in a bore in the bottom of bracket 32 and pierced perpendicular to the direction of first pivot 33A and to the general direction of the lateral traverse of spooling arm 21, such that it lies in a vertical plane. The universal joint allows longitudinal axis 28 of the chassis 24 to swivel in any direction around the center of the joint but prevents rotation of the chassis 24 around longitudinal axis 28 and around wireline 14.

Referring now to FIG. 3B, there is shown in section details of the universal joint discussed above. It should be pointed out that pivots 33A and 33B, as well as the two rollers 36 and 37, all having their axis in a common plane, such that most lateral spooling forces applied to the base bracket 32 will be transmitted to rollers 36 and 37 and then to wireline 14 without transfer to chassis 24. Rods 25 and 26 are shown pivotally coupled to block 30 at pivot 33A allowing chassis 24 to swivel vertically. Block 30 in turn is coupled at pivot 33B to allow block 30 and chassis 24 to swivel laterally. At the same time, the bottom face 35 of block 30 to which rollers 36 and 37 are rotatably mounted may pivot at 33B, the rollers thereby imparting lateral forces to wireline 14 contained therebetween and held from below by sheave wheel 77 in opposition with support wheel 76. The details of arm 61, pin 65 and lever 73 will be described in regard to corresponding numbers for corresponding parts shown in guide assembly 40A, described in detail in regard to FIG. 3C.

In normal operation, spooling arm 21 and second pivot 33B are linked through bracket 32 such that second pivot 33B is kept approximately vertical and first pivot 33A substantially horizontal. A plane of symmetry 34 for rods 25 and 26 located midway between these rods, and hereinafter called the axial plane of the chassis, is thus kept generally vertical. The two cylindrical rollers 36 and 37 between which runs wireline 14 are equal distances from the axial plane of the chassis and guide the wireline by means of lateral forces transferred through spooling arm 21 to spool the wireline on winch 17. It will be noted that a lateral force applied to rollers 36 and 37 will not impart any force opposing the position of the chassis 24 along the wireline 14.

Chassis 24 is maintained along wireline 14 by means of two guiding assemblies 40A and 40B mounted respectively at the front and rear ends of rods 25 and 26. These guiding assemblies are represented in cross section in FIG. 3C and comprise a body 42 made up of two tubular parts 43 and 44 mounted respectively on rods 25 and 26, two longitudinal flanks 45 and 46 and two transverse ribs 47 perpendicular to the tubular parts 43 and 44. The body 42 also comprises two drums 50 and 51 opposite each other and going respectively through flanks 45 and 46. The drums 50 and 51 are pierced with coaxial bores in which are mounted two ball bearings 52 and 53. A support wheel 54 is keyed on hub 55 and mounted rotatably in ball bearings 52 and 53. The axis of rotation of support wheel 54 is thus perpendicular to the axial plane 34 of chassis 24.

A sheave wheel 56 having a peripheral groove 57 in the shape of a V is mounted rotatably on ball bearings 60 in turn mounted on arm 61 which is hinged on pivot 62 and mounted at the lower part of transverse rib 47. Beyond pivot 62, arm 61 has an extension 63 at the end of which is hinged a link 64 by means of pin 65. Link 64 has a flange 68 mounted slidably in a cylinder 66 with a travel-limited inelastic ring 67. A spring 70 is mounted in compression between flange 68 and the head of cylinder 66 which has an extension 71 hinged by pin 72 to lever 73. Lever 73 is itself hinged on the pivot 74 which is fixed to the transverse rib set at 47. When lever 73 is in the low position as shown in FIG. 3C, spring 70 is compressed and biases extension 63 of arm 61 downward. Sheave wheel 56 is thus driven upward and pressed against wireline 14 which in turn is held against wheel 54. To clear the wireline from the guiding assembly, lever 73 is placed in an upper position not shown, thereby decompressing spring 70 and allowing sheave 56 to shift downward around pivot 62. The guiding assembly 40B placed near block 30 is similar to assembly 40A and comprises support wheel 76 and sheave wheel 77 identical to wheel 54 and sheave 56. However, the hub of wheel 76 is connected via a bevel gear 80 and in turn to a mechanical linkage 22 not shown here but previously shown in FIG. 2. Such as described therein, the rotation of wheel 76 may be used to mechanically transmit in case of emergency the wireline movement.

Between the two guiding assemblies 40A and 40B and pivotally supported on rods 25 and 26 is apparatus for producing signals corresponding to movements of wireline 14. A top view of this apparatus is shown in partial section in FIG. 3D which will be described now. A frame 85, also shown and forming part of chassis 24 will be described first.

Rectangular frame 85 comprises at its four corners clamps such as 86 directed upward and adapted to receive rods 25 and 26. A vertical slit 87 makes it possible to secure clamp 86 on rod 25 by means of screw 90. A transverse rear part of frame 85 comprises two clamps 91 directed downward and symmetrically arranged with respect to the axial plane 34 of chassis 24. Clamps 91 are adapted to receive a transverse tube 94 forming part of one slidable mount. Screws 93 secure clamp 91 on tube 94 and keep it in a position perpendicular to axial plane 34. A front transverse part of the frame 85 is fixed by means of nut 95 and adjustable-position clamp 96 to a second transverse tube 97 forming part of another slidable mount.

On either side of axial plane 34, two carriages 100 and 101 are mounted slidably on transverse tube 94 and 97. Carriage 100 comprises two tubular parts 102 and 103 connected by two spacers 104 and 105 to central annular part 106. The tubular parts extend downward by means of uprights 107 and 108, whose lower parts are connected by an open plate 110. In tubular part 102 are mounted ball sockets 111 and 112, kept in place by elastic rings 113 and 114. Ball sockets 111 and 112 are mounted slidably on tube 94, as seen in section in FIG. 3D. Not shown but slidably mounted on tube 97 are similar ball sockets. A crown 115 fitted into tubular part 102 is equipped with seals 116 and 117 and has a threaded part 120 and an end pierced with a hole 121 adapted to receive a pin 122.

A plug 123 is screwed on the threaded part 120. An elastic bellows 124 is fixed at the opposite end of tubular part 102 to prevent the entry of solid particles into the ball sockets.

Inside tube 94, a spring 125 is mounted in tension between pin 122 and a corresponding pin of the symmetrical carriage 101. Tubular part 103 is mounted slidably in the same manner as part 102 on tube 94 but on transverse tube 97, which also contains a spring 126. Springs 125 and 126 are of substantially equal strength and bias carriages 100 and 101 to slide towards each other.

This assembly of two carriages sliding on ball sockets on two transverse tubes is statistically indeterminant and makes the assembly indeformable such that they do not require rigid frame 85 for their attachments to chassis 24. This arrangement is shown in FIG. 2. It is sufficient for these tubes to be fixed at the chassis at three points, one of which has an adjustable position to center the axial plane 34 over wireline 14. As illustrated above, these three points are at 96 for tube 97 and at both clamps 91 for tube 94. In FIG. 3B tubes 25 and 26 are shown in relation to clamps 91 and 92, respectively which appear there as hidden lines. Also shown is an end view of carriages 100 and 101 along with a partial edge view of wheels 135 and 140.

Returning now to FIG. 3D, on a central part 106 is fixed, by means of screws not shown, a bearing body 130 in which is mounted a ball bearing 131. Similarly, in the middle of open plate 110 is fixed by means of screws 132 a second bearing body 133 (visible in FIG. 3A) and contains a ball bearing coaxial with bearing 131. Inside these two bearings is mounted rotatably shaft 134 of measurement wheel 135 which, because of its tangential contact on the side of wireline 14 when carriage 101 is driven towards axial plane 34 by springs 125 and 126, will pinch wireline 14 and rotate with its movement.

At the upper end of bearing body 130 is fixed photoelectric encoder 136. This conventional-type encoder comprises a disk on the periphery of which are engraved alternately transparent and opaque zones which cut off the optical path between a light source and receiving cells. The disk of the encoder 136 is connected to shaft 134 of measurement wheel 135 to respond to its rotation. The encoder delivers two signals having frequencies proportional to the rotating speed of the wheel 135, these two signals being out of phase by +90°, as shown in FIGS. 6A and 6B, depending on the rotating direction.

Likewise, a second measurement wheel 140 is mounted rotatably on carriage 101 so as to come into tangential contact on the other side of wireline 14. On carriage 101 is mounted a second encoder 137 like encoder 136 which generates signals representative of the rotation of wheel 140. It will be noted that springs 125 and 126 have a combined effect of pinching the wireline between the two measurement wheels. These pinching or contact pressures oppose each other and balance out so that equal contact pressures are exerted on the wireline by each wheel. They also do not exert any force opposing the transverse movements of this force-balanced measurement wheel assembly which might be produced from the effect of a curve in the wireline in the rotational (here horizontal) plane. In the optimum position of the device in which the points of application of the measurement wheels are on a horizontal section of wireline 14, the application forces of these wheels against the wireline are in opposite directions and equal to each other because they are due only to the sum of the tensions of biasing springs 125 and 126.

On the chassis 24 are also mounted means for spreading the measurement wheels away from each other and allowing the installation of the wireline between these two wheels. In the middle of a stirrup 142 fixed to longitudinal rods 25 and 26 is rotatably mounted a vertical shaft 143 at the lower end of which is placed a cam 144. At the top part of shaft 143 is fixed an inclined lever 145 which allows cam 144 to be rotated manually. Cam 144 has two flat parts 146 near each other and two grooves 150 and 151 further apart, connected to the flat parts by symmetrical rounded parts. An internal spring (not shown) keeps the cam in the position of FIG. 3D. An arm 152 is fixed to the side of carriage 100 by screws 153 and extends horizontally up to a certain distance from flat parts 146. Another symmetrical arm is fixed to carriage 101. When lever 145 is turned clockwise, cam 144 engages the tip of arm 152 and, by overcoming the biasing of springs 125 and 126, slides the measurement wheels away from each other, thereby allowing the introduction of wireline 14 between them. Opposite rotation of lever 145 allows the two measurement wheels to slide into contact with wireline 14.

As shown in FIGS. 3A and 3D, offset slightly rearward with respect to the center of the frame 85 and fixed on the rods 25 and 26, is a magnetic mark detector 147 having concave poles 148 and 149 arranged near and over wireline 14. This detector is, for example, of the Hall effect type and delivers an electric signal when a magnetic mark moves between the poles 148 and 149.

Not shown in FIG. 3D but shown in FIG. 3A is means for erasing the magnetic marks and means for inscribing new magnetic marks on wireline 14. At the rear part of block 30 is fixed a clevis 150 on which is hinged by means of a pin 151 a support 152. Two longitudinal rods 153 and 154 having the same spacing as rods 25 and 26 are fixed to support 152 and have elastic bumpers on their front ends, such as 155, which move to a position opposite two other bumpers such as 156 mounted at the rear ends of rods 25 and 26. A second chassis, made up of support 152 and rods 153 and 154, can thus swivel in a horizontal plane around the pin 151. The maximum angles which may be taken by rods 153 and 154 with respect to axial plane 34, are however limited by the bumpers such as 155 and 156. At the bottom of support 152 is fixed a solenoid 160 whose ends are terminated on insulated studs 161 and 162. These studs allow removal of the solenoid winding from the chassis to facilitate rotation of the winding around wireline 14 so the wireline will pass through its center. The solenoid then surrounds wireline 14 without touching it. If an alternating current source is connected through studs 161 and 162 into solenoid 160, the magnetic marks inscribed on wireline 14 will be erased as they go through the solenoid.

On an intermediate part of the rod 153 is fixed, by means of lateral branches 158, an electromagnetic 163 used for writing magnetic marks on wireline 14. The electromagnet 163 has two magnetic poles 164 and 165 placed over and near the wireline. A pulse of current sent into electromagnet 163 writes a magnetic mark on the part of wireline 14 which at that moment is located opposite poles 164 and 165. On the rear ends of rods 153 and 154 is fixed a guiding assembly 40C substantially identical to guiding assembly 40A which positions longitudinal rods 153 and 154 parallel to the section of wireline 14 located between the assemblies 40B and 40C and consequently determines the positions, over the wireline, of erasing solenoid 160 and of electromagnet 163. It will be noted that when wireline 14 moves from front to rear; i.e., during an upward movement of borehole tool 12 in borehole 13, it encounters successively poles 148 and 149 of magnetic mark detector 147, mark erasing solenoid 160 and then electromagnet 163. This arrangement makes it possible to use existing marks for a depth setting before erasing them and replacing them by new marks. Alternative positions for the mark detector, such as at 62 shown in FIG. 2, serve this purpose while going down the borehole. Of course, the positions of devices 160 and 163 would also need to be reversed to prevent erasure of the new marks in this case.

Encoders 136 and 137 are connected to processing circuits shown in FIG. 4. Referring now to FIG. 4, encoder 136 corresponding to the right wheel has two outputs 180 and 181 connected respectively to two amplification and shaping circuits 184A and 184B whose outputs are connected to wheel calibration circuit 302 which will be described later in regard to FIG. 7, and then to a directional logic circuit 386 having two outputs 387 and 388. The signals S384 and S385 appearing on the outputs 384 and 385 are periodic rectangular signals whose frequency is proportional to the rotating speed of the measurement wheel 135. Signal S385 lags by a quarter cycle in relation to signal S384, as shown in FIGS. 6A and 6B, if the wheel 135 rotates in an up direction corresponding to raising borehole tool 12 in the borehole. If borehole tool 12 is lowered in the borehole, the wheel 135 rotates in the opposite direction and signal S385 leads by a quarter cycle with respect to signal S384, as shown in FIGS. 6P and 6Q. Directional sensing circuit 386 generates electrical pulses on its output 387 when the wheel 135 rotates in the up direction as shown in FIG. 6C at S387 and on its output 388 if the wheel 135 rotates in the opposite direction, as shown in FIG. 6S at S388. Each electrical pulse corresponds to a rotating increment of the measurement wheel 135. A further description of this type of encoder and direction sensing may be found in the previously discussed U.S. Pat. No. 3,566,478 issued to Hurlston.

As shown in FIG. 4, the output signals of encoder 137, corresponding to the left wheel 140, are similarly applied to amplifying and shaping circuits 190A and 190B and then to wheel calibration circuit 303, then in turn to a directional sensing circuit 392 which generates electrical pulses on its output 393 in the up direction and on its output 394 in the down direction of wireline 14. Only the up direction signals are shown for the left wheel in FIG. 6 at G and H as S393 and S394. Each electrical pulse is representative of a rotation increment of the measurement wheel 140. The four outputs 387, 388, 393 and 394 are connected respectively to four elementary memories 395, 396, 397 and 398 interrogated sequentially by a clock circuit 300. The four memories and the clock circuit are designed to offset the time of the pulses capable of appearing simultaneously at outputs 387, 388, 393 and 394. Each pulse is kept temporarily in an elementary memory until the memory is interrogated by a particular clock pulse S1–S4. As shown in FIGS. 6I through 6N, interrogations by the clock circuit 300 are carried out at a frequency higher than the maximum frequency of the pulses being generated by directional sensing circuits 386 and 392. Incremental depth pulses, when present, thus leave memories 395 to 398 when interrogated and therefore are offset with respect to time.

As shown in FIG. 4, pulses output from the memories 395–398 are applied to four AND gates 306, 307, 308 and 309 which conduct during normal operation and whose purpose will be explained further below. The memory outputs are also applied to OR gates 325 and 326. Before describing the function of these and related circuits, refer to FIG. 5 where process flow diagrams corresponding to these functions are shown.

Figure 5A:
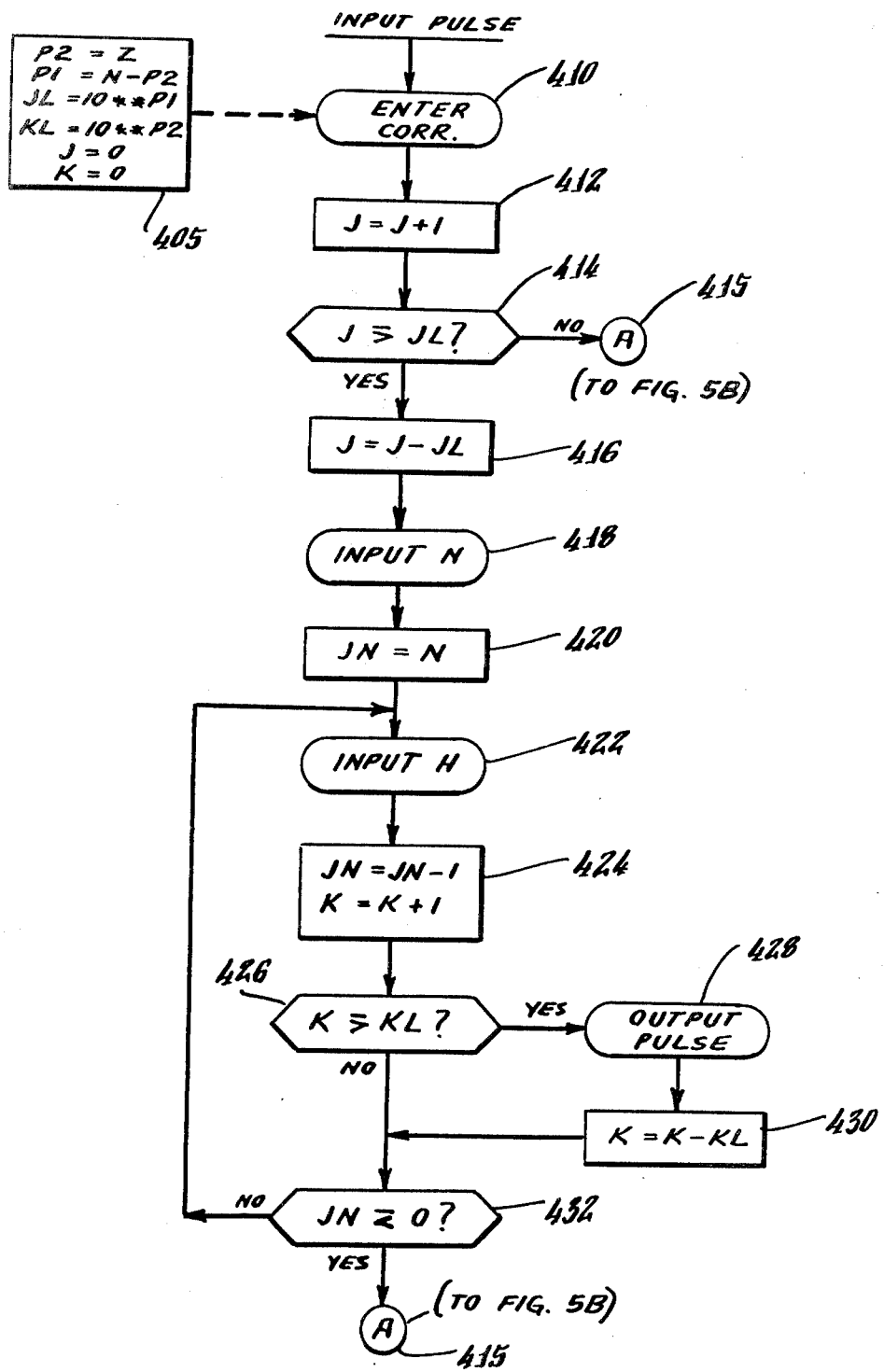
FIGS. 5A through 5D show signal processing flow diagrams.
Figure 5B:
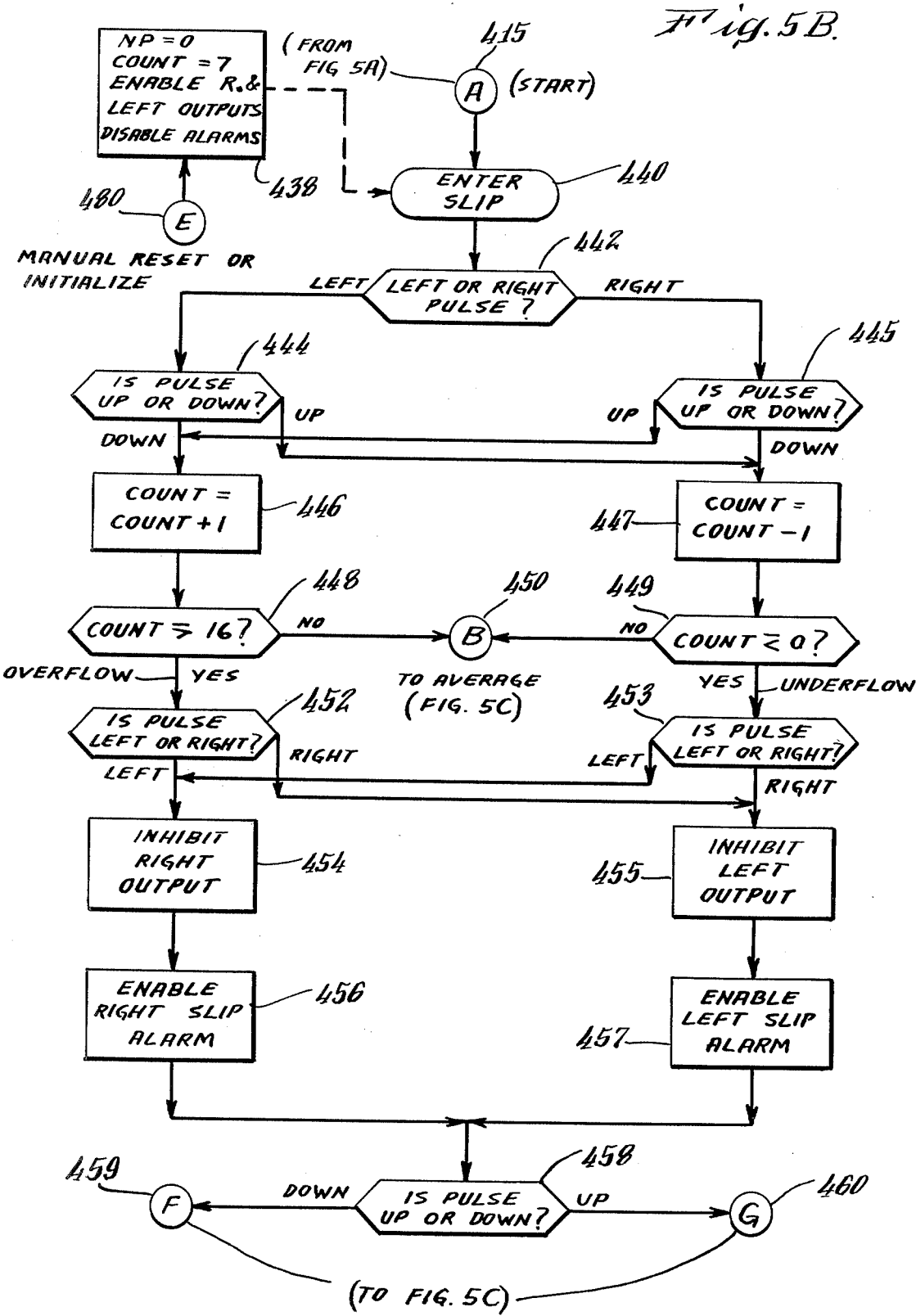

FIG. 5A describes the functions of a wheel calibration circuit such as those shown schematically at 301 and 303 in FIGS. 2 and 4, and exemplified by the circuit diagram shown in FIG. 7. This circuit and its function will be described in detail later. For now, it suffices to consider the circuit as correcting two series of pulses by adding in N additional pulses each time a preselected number of input pulses is accumulated. FIG. 5B describes a slip detection process and FIG. 5C describes a signal averaging process and FIG. 5D a reset procedure.

In general, the slip detection process comprises comparing the short-term frequency of the left and right signal pulses. It will be recalled that these signals are independently generated and correspond to rotation of different but substantially identical measurement wheels both rotating with movement of wireline 14. The illustrated process utilizes an UP/DOWN counter initialized to one-half a predetermined value. For a given wireline movement direction, as for example, movement in the downward direction, signals from the left wheel are used to count up the counter while signals from the right wheel are used to count down. Each time the counter is incremented up, it is checked for overflow or equalling the predetermined value and each time it is decremented, or counted down, it is checked for underflow or reaching zero. Either condition indicates one wheel is rotating faster than the other. The fastest wheel caused the generation of the pulse which created the underflow or overflow so that a check as to the source of the pulse identifies the fastest wheel.

Further pulses from the slower wheel may be subsequently inhibited and a corresponding slippage alarm enabled. The process then continues, utilizing only the independent signals corresponding to the fastest wheel. As previously explained, the detection of a faster appearing wheel may indicate, in addition to slippage of the slower wheel, a faulty signal from the encoder or electronics associated with the slower wheel. In any case, the signal from the apparently slipping wheel is unreliable and cannot be depended upon to repeat. Therefore, selection of the signal from the "faster" wheel is still correct, regardless of cause, and produces the desired result.

Referring now to FIG. 5B, a process corresponding to slippage detection and enablement of slippage alarm indications and selection of fastest wheel output is diagrammed. The corresponding portion of the circuit diagram of FIG. 4 begins at the output of memories 395 through 398. As the processes illustrated in FIG. 5 may be readily performed on a digital computer or microprocessor, these figures are described in terms which would enable their programming.

Beginning at point A of FIG. 5B where the routine SLIP is entered at block 440, it is determined as shown at block 442 whether the input pulses correspond to a left or right wheel signal. Corresponding respectively then at block 444 and 445, it is determined whether these pulses correspond to the up or down direction for movement of the wireline. Accordingly, as shown at block 446, pulses found to be left wheel down pulses and right wheel up pulses are used to increment the contents of a counter labeled COUNT, while left wheel up pulses and right wheel down pulses are similarly used to decrement the same counter as shown at block 447. Initially, or upon each reset, and as indicated in block 438, the original count of this counter was equal to 7. Also shown at 438 are the normal conditions for operation which include enabling of the right and left pulse outputs and disablement of all alarms. A counter NT shown in FIG. 5D is also zeroed.

Following each decrementation of the counter, and as shown at block 449 of FIG. 5B, the counter is checked to see if it has reached the level zero or underflowed, which would cause this test to answer YES and the process to proceed as shown to block 453. Similarly, for each incrementation of the counter and as shown at block 448, the contents of the counter is checked for overflow or reaching a maximum about twice the difference between its initial and underflow values or 16. If no underflow, as indicated by a NO result for the test shown in block 449, or no overflow as indicated by a NO result for the test shown in block 448, occurs, the process resumes at point B shown at 450 in FIGS. 5B and 5C. Otherwise, it is again determined whether the input pulse corresponds to a left or right pulse as accordingly shown for underflows at block 453 and for overflows at block 452. Subsequently, as indicated at block 454, left wheel underflows or overflows cause the inhibiting of the right wheel output, and similarly, as shown at block 455, right wheel underflows or overflows cause the left wheel output to be inhibited. Further, as shown at blocks 456 and 457, the corresponding slip alarm indicator is enabled. Then, depending upon whether the pulse is an up or down pulse, as indicated at block 458, the process continues at points F or G, respectively, as shown at blocks 459 and 460 of FIGS. 5B and 5C.

In summary, the process illustrated in FIG. 5B and which may be performed by the center group of circuit components shown in FIG. 4 determines which wheel appears to be the most rapidly rotating wheel. The signals corresponding to this wheel are then selected for output by inhibiting signals from the apparently less rapidly rotating wheel. An alarm such as shown at 352 or 353 of FIGS. 2 and 4 is enabled to indicate which wheel appears to be slipping as indicated by its less rapid rotation. If the output from both wheels is found to be in balance, indicating both wheels are operating under the same wireline measurement conditions, the output may be combined to form an average as will now be described in regard to FIG. 5C.

Figure 5C:
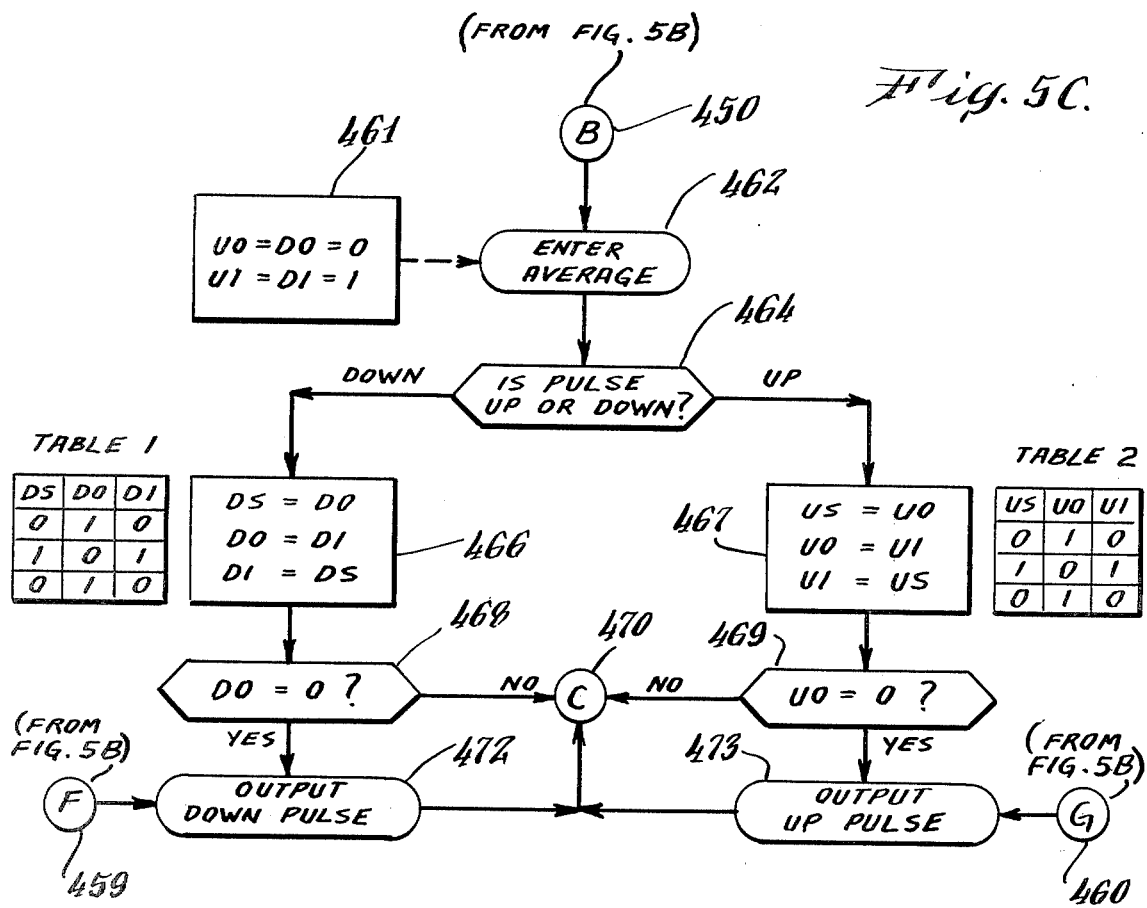
Figure 5D:
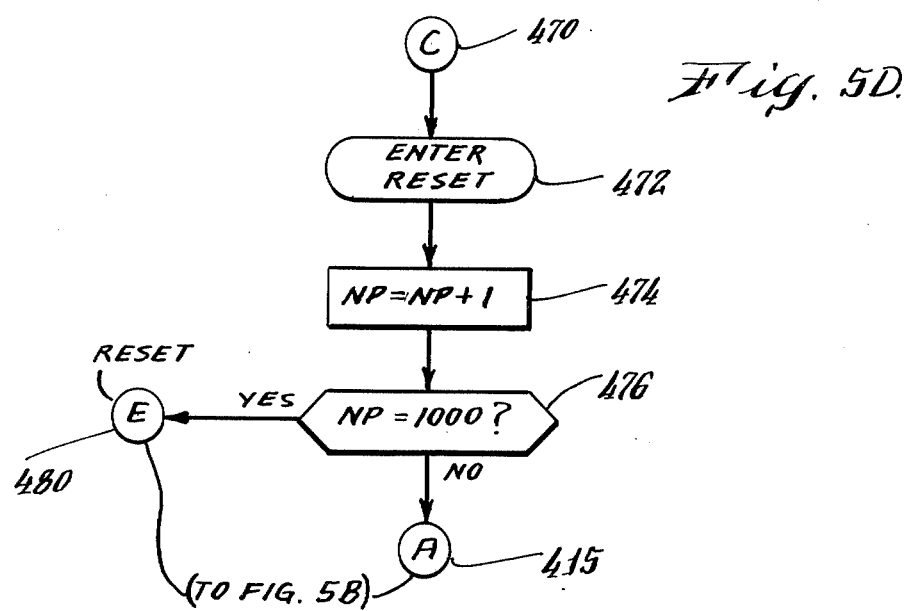

Referring now to point B in FIG. 5C, which is also shown in FIG. 5B and corresponds to the next step in the process, when no underflow or overflow is found an average routine is entered, as indicated at block 462 of FIG. 5C. In the manner described above and as shown at block 464, it is determined whether the most recent output pulse corresponds to the up or down direction. As shown in blocks 466 and 467 which follow, down pulses are processed separately from up pulses but use the same logic. Separate bistable devices for down and up pulses change state each time a pulse is input through the device. On one of the states an output pulse is provided, thus dividing the number of input pulses by two.

As shown in FIG. 5C, the bistable conditions are stored in devices labeled U0 and D0 respectively corresponding to the up and down logic. Both are initialized to state 0 as shown in block 461 of FIG. 5C. An alternate state is stored in U1 and D1 and is initialized to 1 as shown at block 461. Separate up and down logic shown at blocks 466 and 467 stores in DS and US the current state of D0 and U0 respectively and then transfers the alternate state from D1 or U1 to D0 or U0. The stored state then replaces the previous alternate state. Table 1, shown in conjunction with block 466, exemplifies this process and illustrates how D0 changes its condition with every other down pulse. Table 2, shown in conjunction with block 467, exemplifies how U0 changes its condition with every other up pulse. As shown at blocks 468 and 469 which follow, D0 and U0 are tested for one of their two possible states. On one state, an output pulse results as indicated at blocks 472 and 473. Note that output pulses may result by bypassing the above averaging logic when the process continues from points F or G, as previously described in regard to FIG. 5B and resulting when the output pulses from one of the wheels is inhibited. After each output or, for the non-output condition as indicated by a NO result for the bistable logic test indicated in blocks 468 and 469, the process continues at point C shown in FIGS. 5C and 5D.

Referring now to FIG. 5D, a reset routine is diagrammed beginning at block 472. A counter designated NP which has been previously reset to 0 is incremented as shown at block 474 each time a pulse is output as described above. Separate counters may be used as desired for up and down pulses, for example. Only counter NP will be described. As shown at block 476, each time NP is incremented, it is tested for equality to a relatively large number such as 1,000, and if this number has not been reached the process returns and continues at point A already described. If, however, the large number of increments has occurred, a YES answer results and the process continues at point E for an automatic reset as shown in FIG. 5B at block 438.

Referring now to FIG. 5B and block 438, a reset may be initiated each time the test shown in block 476 of FIG. 5C answers YES or upon a manual reset indication. The reset also occurs when electrical power is first provided to the circuit shown in FIG. 4. A manual reset would be provided, for example, when a previously indicated slippage condition was presumed to be corrected. The reset process sets counter NP described in regard to FIG. 5D to 0 and resets the counter count described in regard to FIG. 5B in conjunction with the slippage detection to its average or mid-range value which, in the illustrated case, is 7. Both the left and right wheel output pulses are enabled so that the averaging process may be resumed and any previously enabled alarms are disabled. After reset the process continues, as indicated at block 440 in FIG. 5B to test each new input pulse, as shown at block 442. Now that the processing of the electrical pulse signals shown by the circuit groups illustrated in FIG. 4 have been described, the details of a particular circuit will be provided.

Returning to FIG. 4 and the averaging circuits, outputs of AND gates 306 and 308 are input to an OR gate 311 which adds pulses coming from the two encoders 136 and and 137 for upward movement of the wireline. Outputs of AND gates 307 and 309 are input to an OR gate 312 which adds pulses coming from the two encoders for downward movement of the wireline. Outputs of the OR gates 311 and 312 are input to a two-way divider 313 having two outputs 314 and 315. Divider 313 behaves essentially as two scale-of-two dividers, one with input from OR gate 311 and output 314 to AND gate 316 and the other with input from OR gate 312 and output 315 to AND gate 320. Divider 313 also has the effect of eliminating two successive pulses arriving from gate 311 and gate 312 respectively. This separate up and down logic and its resulting output was previously described in regard to FIG. 5C.

Thus on output 314 is provided the half-sum i.e., the average of the (−) pulses generated by encoders 136 and 137 during upward movement of wireline 14 while corresponding output 315 provides in like manner the average of the (+) pulses generated during downward movement as measured by wheels 135 and 140.

AND gate 316 conducts output in normal operation via OR gate 317 for a first output 318 of the processing circuits. AND gate 320 conducts output 315 in normal operation via OR gate 321 for a second output 322 of the processing circuits.

In the event of the failure of a measurement network, and in particular that of an encoder, or in the event of slippage of one wheel even for a short interval, the processing circuits of FIG. 4 are designed to automatically operate with the remaining measurement network. The failure of a measurement network in most cases results from the slipping of a measurement wheel, trouble with an encoder or a poor connection between an encoder and the processing circuits. Such failures result in too few pulses and a measured length which is too small. The processing circuits are thus designed to compare and determine the relative deviation frequency between pulse signals or the displacements measured by the two networks, to recognize the measurement network which indicates the fastest displacement corresponding, in cases of slippage, to the more rapidly rotating wheel, and to block the pulses coming through the network corresponding to the other wheel.

Returning to FIG. 4 and the process previously described in regard to FIG. 5B, outputs of memories 395 (−) and 398 (+) are input to an OR gate 325, and the outputs of the memories 396 (+) and 397 (−) are input to an OR gate 326. The outputs of OR gates 325 and 326 are input respectively to the add (+) and subtract (−) terminals of an adder-subtracter circuit 327. Another input terminal 328 resets circuit 327 to its average or midrange value. When circuit 327 has, for example, sixteen states, a pulse applied to the terminal 328 would reset it to the state 7. As we shall see further below, the pulse for resetting circuit 327 to its average state is applied whenever a predetermined length of wireline has run past the measurement wheels. Conventionally, such adder-subtracter circuits have an overflow (+) output as shown at 330 in FIG. 4 and an overflow (−) output as shown at 331. As employed in FIG. 4, signals appear at 330 when the adder overflows upward (passage from state 15 to state 0) or at 331 when it overflows downward (passage from state 0 to state 15). The state of circuit 327 thus represents the relative pulse frequency or deviation of the incremental lengths measured by the measurement networks associated respectively with the encoders 136 and 137. When this relative deviation exceeds a predetermined threshold, equal here to 0.8 percent as described below, a signal appears on one of the terminals 330 and 331.

The output of terminal 330 and the output of the memory 395 are input to an AND gate 332. The output of terminal 331 and the output of the memory 396 are input to an AND gate 333. The output of terminal 330 and the output of the memory 398 are connected to an AND gate 334. The output of terminal 331 and the output of the memory 397 are input to an AND gate 335. The output of AND gates 332 and 333 are input to an OR gate 336, and the output of AND gates 334 and 335 are input to an OR gate 337. All the gates 325 to 337 are designed to utilize the pulse series, generated by both encoders 136 and 137 and determine which indicates a more rapid rotation of one of the wheels. In fact, a pulse appears at the output of the gate 336 when the pulse which caused circuit 327 to overflow came from right wheel encoder 136. This pulse sets a flip-flop 340 whose output $\bar{Q}$ inhibits AND gates 308 and 309, blocking the left wheel output; i.e., the pulses coming from the encoder 137. Conversely, if the pulse which caused circuit 327 to overflow came from left wheel encoder 137, a pulse appears at the output of OR gate 337 and sets flip-flop 341 whose output $\bar{Q}$ inhibits gates 306 and 307, blocking the right wheel output; i.e., the pulses coming from the encoder 136 as indicated at 353.

Having blocked the pulses coming from what appears to be a less rapidly rotating wheel, which may be due to slippage but could be due to a defective measurement network, it is also necessary to short-circuit or bypass, as was described in regard to FIGS. 5B and 5C, the averaging of scale-of-two divider 313. The outputs $\bar{Q}$ of flip-flops 340 and 341 are input to an OR gate 342. When one of these flip-flops is set, a ONE signal appears at the output of OR gate 342 and enables AND gates 343 and 344 to conduct, by passing divider 313, while blocking its output by inhibiting AND gates 316 and 320 via an inverter 345. Divider 313 is thus short-circuited. The encoder pulses corresponding to the more rapidly rotating wheel, good encoder or unfailing measurement network are thus input directly to OR gates 317 and 321 to provide outputs 318 and 322 of the processing circuits.

Outputs 318 and 322 are applied successively to three scale-of-ten dividers 346, 347 and 348 which thus carry out a total division by one thousand, as was described in regard to FIG. 5D. The outputs of divider 348 shown in FIG. 4 are input to an OR gate 350 and then, via another OR gate 351, to the reset terminal 328 of the adder-subtracter circuit 327 to reset circuit 327 as previously described. OR gate 351 also receives a signal output from a manual control which is also applied to the reset terminals (R) of the flip-flops 340 and 341 which then reset from $\bar{Q}$ to Q outputs which enable AND gates 306-308 to conduct normally. Two indicators, preferably in the form of lights 352 and 353, previously enabled by outputs Q of the flip-flops 340 and 341, respectively indicating slippage or failure of the left or right wheel, encoder or measurement network, are now disabled.

The manual control makes it possible to put back into operation the two measurement networks at any time but more particularly at the beginning of the wireline measurements or in the event of temporary failure of one of the two networks. In automatic operation and the example described earlier using a reset value of 7 and a positive overflow valve of 16, one of the measurement networks is selected when the independent signals measured by the two networks differ by about 0.8 percent as mentioned earlier, since the divide by 1000 circuitry 346-348 automatically resets the adder-subtracter circuit 327 upon the accumulation of 1000 pulses and a difference of 8 pulses per 1000 pulses is required to produce an overflow.

In addition to the use of processing circuit outputs 318 and 322 by divide circuits 346 through 348, these outputs may be used as previously described in regard to FIG. 2 as $\pm\delta l_{mc}$ signals shown as input to block 540. Of course, it will be realized that the processing illustrated for blocks 540, 550 and 340 may be bypassed and the $\pm\delta l_{mc}$ pulses used as $\pm\delta l_T$ pulses input to block 578 and utilized to provide the depth display 580 or drive recorder 18 in correspondence with the wireline movement. This is now possible because the slidable mounting of the opposing measuring wheels 135 and 140 eliminates many causes of wheel slippage and the processing of the independent signals generated by encoders 136 and 137 provides further protection from slippage as well as from component failures within the associated independent measurement networks. A further feature of the signal processing circuitry shown in FIGS. 2 and 4 but particularly shown in detail in FIG. 7 will now be described.

It will be recalled that, due to manufacturing tolerances, wear, etc., measurement wheels such as 135 and 140 may be expected to differ in their circumferences from a standard calibration circumference. By means of calibration runs as against a standard wheel or with a calibrated wireline loop, these differences may be determined. It is advantageous to express these differences as a variance factor such as $\pm N$ increments per $10^n$ where N and n are both integers. It is even possible to determine two values for N; N1 for a particular wheel when it is used in a positive sense, as for example, when running in the borehole, and a different number N2, when used in a negative sense, as for example while moving wireline out of the borehole. With these factors predetermined, a correction circuit such as shown in FIG. 7 may be employed to perform the function as indicated in block 301 or 303 corresponding to independent left and right wheel calibrations. As shown in FIG. 4, this predetermined factor $N_R$ and $N_L$ may be different for the right and left wheels. independent circuits are provided to allow independent calibrations of each wheel to the standard. It should be mentioned that it is relatively unimportant whether this calibration correction is performed before or after the directional sensing indicated in blocks 386 and 392 of FIG. 4. For a brief description of the correction process illustrated therein, refer now to FIG. 5A.

It will be recalled that the correction is to be performed on a series of pulses such as generated by encoders 136 and 137. While correction circuits are available in the prior art for correcting such pulses, as for example, described in U.S. Pat. No. 3,753,294 issued Aug. 21, 1973 to Georges Attali, et al. and as described therein, they take the form of a bidirectional counter which counts the plus and minus pulses in corresponding directions while continuously comparing its contents with a preselected digital number. Upon equality, a single pulse is output and the counter reset. This type of correction circuit may be said to operate by adding or subtracting one pulse per m pulses, where m is a number defined by several digits. Further, m usually has arbitrary values which make it difficult to remember. In contrast, circuits shown in FIG. 7 and diagrammed in FIG. 5 add or subtract N pulses per $10^n$. Since n may be varied with circuit design, N may be advantageously kept to a range of 1 or 2 digits, which not only makes it easier to use but makes the digital input device much less expensive.

Referring now to FIG. 5A and as indicated at 410, the correction process begins as indicated at block 412, by incrementing a first counter J whose contents, along with the contents of a second counter K was initialized to zero as shown at block 405. As also shown at block 405 two circuit design parameters P1 and P2 are defined such that their sum equals n. P2 corresponds to the number of digits in N.

By example, let N have two digits, then P2=2, P1 becomes n-P2; and where n=5, P1=3. The two corresponding counter limits JL and KL may also be defined as $10^{P1}$ and $10^{P2}$. In the example illustrated in FIG. 5A the overflow limits for counter J with P1=3 is JL=1000 while for counter K with P2=2 it is KL=100.

As shown at block 414 of FIG. 5A, after incrementing, the contents of counter J is tested against its overflow limit JL and if no overflow is found as indicated by a NO answer, the process continues at point A as shown in FIG. 5B, which has already been described in regard to the slippage or network failure detection process. If J has counted to JL, the test shown in block 414 answers YES and counter J is decremented by JL as shown in block 416. Then, in contrast to the prior art correction circuit described in Attali, et al., a small integer N (here having three digits) is input as shown at block 418 and transferred to reference counter JN shown in block 420. Then, as indicated in block 422, a high frequency clock pulse H is input. This may be generated, as for example, by clock 300 shown in FIGS. 2 and 4 and illustrated in the timing diagram corresponding to FIG. 6I is input.

Each clock pulse causes counter JN to be decremented by 1 and counter K to be incremented by 1 as shown at block 424 of FIG. 5A. In turn, the contents of counter K is tested against its overflow limit KL as shown in block 426. If no overflow occurs, the process continues by testing JN for zero as shown at block 432. If JN has not been decremented to zero at this time, the process continues with the input of another clock pulse H as shown at block 422. JN is again decremented and K incremented, until either counter K overflows as indicated by a YES answer for the test indicated in block 426, or JN reaches zero. In the first case, an output pulse results as shown in block 428, which follows by the decreasing of K by KL and the return to the testing of JN as shown in block 432. In the second case, when JN=0 and provides a YES answer, indicating all N pulses have been output, the process JN continues at point A of FIG. 5B already described.

For example, let P2=2 corresponding to a two-digit N value of eleven (11) taken from the only two non-zero least-significant digits of a calibration factor 1.00011 having five significant digits to the right of the decimal point; i.e., n=5 as in the previous example. The overflow limits for the first stage counter J is thus 1,000 and 100 for the second stage counter K (P1=3, P2=2, n=5).

Each time counter J overflows, N=11 pulses are output into counter K. Each time counter K overflows, one correction pulse is output. In this example, counter J overflows every one thousand pulses input to the correction circuit, each overflow causing 11 pulses to be input to counter K. After nine counter J overflows, counter K will contain 99 pulses. During the tenth counter J overflow, counter K will overflow and output one correction pulse. However, counter K will continue to receive more pulses from the 11 pulses corresponding to N, leaving a remainder of 10 pulses. These pulses accumulate with subsequent counter J overflows to 21, 32,—98, etc., until counter K again overflows during counter J's 19th overflow and outputs an additional correction pulse. This process continues such that during $10^n$ pulses input to the correction circuit, counter J overflows $10^{P2}$ times, causing $N \times 10^{P2}$ pulses to be input to counter K, which cause counter K to overflow N times and output N pulses, since counter K overflows every $10^{P2}$ pulses.

It will be appreciated that counter K may be of the UP/DOWN type and that pulses corresponding to upward or downward wireline movement may be used to steer the counter to count up or down accordingly, rather than to simply count up counter K as described above.

It will be clear from the above that by proper selection of n, the number of digits for N may be limited, which provides a cost advantage for digital thumb wheels or the like necessary for inputting this number.

Referring now to FIG. 7, two series of electrical pulse signals $\pm \gamma l_m$ are respectively applied to two inputs of a calibration correction circuit 255 whose functions are to achieve a multiplication by a predetermined calibration factor C where C corresponds to a number very close to unity but has five or six significant digits to the right of the least decimal point, with only the last few least significant digits differing from zero. Another example of such a factor is the number 1.00003 where "3" is the number of interest. The least significant digits could have any integer value so will be considered as N and may be found by subtracting C from unity and scaling up the small difference remaining by factors of 10 until N appears as a whole number; i.e., $N=(1-C)\times 10^n$, $N>1$. In the above example N=3 and n=5. When applied correctly, there will be a difference of N pulses in the output of circuit 255 for every $10^n$ pulse input.

N may be supplied manually by only a one or two digit digital thumbwheel or the like. As shown in FIG. 7, provisions are made for two different N numbers, N1 and N2 such that a correction corresponding to $\pm \delta l_{mc} = \pm \delta l_m \pm \delta l_m (N1-N2) 0.10^{-n}$ results.

As an example and as described in regard to FIG. 5A, where n=5, P2=2 and P1=n-P2=2, and P1-decade add-subtract circuit 256 which receives on its two inputs two series of pulses $\pm i$ and delivers on its two outputs one pulse $\pm I$ for $10^{P1}$ pulses i received. Each output pulse $\pm I$ causes the introduction of two numbers N1 and N2 represented by a series of digits into the stages of a first (257A) and a second (257B) P2-decade adder-subtracter respectively. The first (257A) of these adder-subtracters will then be in a $\pm N1$ state and receives for subtraction from synchronized clock circuit 300 pulses H with a relatively high frequency which bring it back to zero. Adder-subtracter 247B, in a $-N2$ state, receives in the same manner these same subtraction pulses H. Depending on the sign of the triggering pulse ±I, these clock pulses, N1 and N2 in number, are transmitted, N1 for adding and N2 for subtracting (or vice versa) to another adder-substracter 258 having $P2=n-P1$ decades. Its outputs are synchronized by a signal S2, shown in FIG. 6K, delivered by clock circuit 300. On the two outputs of the circuit 258 thus appear pulses which satisfy the law $i_s=\pm i(N1-N2)\cdot 10^{-n}$. These pulses $\pm i_s$ and the input pulses $\pm i$ are applied, depending on their sign, to the inputs of two additional OR gates 260 and 261.

External links 259A and 259B between inputs of circuit 255 and OR gates 260 and 261 may be eliminated if only the correction pulses are desired. In the case of the calibration correction, the links are present and the output provides two series of pulses for the corrected length measurement $\pm\delta l_{mc}$. It will be noted that the input signals $\pm\delta l_m$ of circuit 255 may be synchronized by a signal S1 and the correction pulses produced by the adder-substracter 258 synchronized by a signal S2, these two signals S1 and S2 being delivered by the clock circuit 300 as shown in FIG. 6I-K. Under these conditions, the correction pulses $\pm i_s$ thus provided do not coincide with the input pulses $\pm i$, which makes it possible to add them without error.

There have been described method and apparatus for providing a signal representative of movement of a wireline used in logging boreholes. The provided signal is repeatable on different runs in and out of a borehole and under varying wireline measurement conditions which makes it particularly suitable for utilization in deriving a recorder for recording measurements from a borehole tool lowered in the borehole on the wireline in correspondence with the depths of the tool.

The repeatable characteristics of the signal are derived from a number of improvements over the prior art. Rather than a single wheel riding along the top of the wireline, two substantially identical wheels are tangentially coupled to opposite sides of the wireline. Slidable mounts for carriages supporting the wheels and biasing means urging the wheels to slide toward each other, engaging the wireline between the wheels insure coupling the wireline to each wheel in substantially the same manner such that under ideal wireline measurement conditions, encoders responsive to their rotation with movement of the wireline would produce corresponding signals.

Mounting of the measurement wheels to rotate in a generally horizontal plane, rather than in the vertical plane typical of the prior art overcomes accuracy and slippage problems associated with vertical acceleration and wireline path curvature of the generally horizontal section of the wireline near the winch, which is preferred for placement of the measurement wheel. The slidable mounts, pivotal supports and force-balanced biasing all assist in overcoming problems previously caused by lateral spooling forces also present in this section of the wireline.

While one encoder responsive to the rotation of one wheel supported as above would provide a substantially improved signal, encoders for each wheel are preferred to produce independent signals. Where necessary, electrical calibration circuits are provided to correct for any difference between the wheel and a standard. Thus independent signals from non-standard wheels could also be corrected to correspond to the movement of the wireline under ideal wireline measurement conditions. However, ideal conditions are rarely present in well logging, and accordingly the independent signals are utilized to provide a repeatable signal even under non-ideal conditions.

By comparing the independent signals, it is possible to determine if one wheel appears to be rotating more rapidly than the other. As explained herein, while slippage actually may cause one wheel to rotate more slowly than the other, other unrepeatable factors such as faulty encoders and weak or lost encoder pulses may also give this appearance. However, in any case, the most repeatable signal is the one produced by the faster appearing wheel and is automatically selected for output. Appropriate alarms indicating the apparent slippage and indicating which wheels are also provided. Where comparing the independent signals finds little difference; i.e., no wheel appears to be rotating more slowly as if it were slipping, the signals may be averaged to provide a signal more repeatable than either independent signal since short term variations are averaged out.

Different combinations of the above novel features will be obvious, as for example the independent signal processing could be adapted for use on signals corresponding to different types of measurement wheels or wheels supported in a different manner. The processing could be done with different apparatus, as for example by a digital computer programmed as shown in FIGS. 5A-5D. Both the independent signals from the encoders and the measurements from the borehole tool could be recorded for latter processing or transmitted together to a distant computer and processed there.

The above-described embodiments are, therefore, intended to be merely exemplary and all such variations and modifications are intended to be included within the scope of the invention as defined in the appended claims.

We claim:

1. Apparatus for providing a repeatable signal representative of movement of a wireline used in logging boreholes and suitable for driving a recorder under varying wireline measurement conditions for depth recording measurements from a borehole tool lowered in said borehole on said wireline, comprising:

means for producing independent signals, comprising:
   substantially identical wireline measurement wheels,
   chassis for support and guidance of assemblies aligning said wheels in a generally horizontal plane along said wireline,
   carriages for said wheels slidably mounted on opposite sides of said chassis, said slidable mounts providing for slidable movement of said carriages along two substantially parallel lines transverse to the direction of said wireline movement and rotation of said wheels in a plane generally parallel to a plane including said two parallel lines,
   means for equally biasing said wheels to slide towards each other on said slidably mounted carriages and tangentially engage said wireline on opposite vertical sides of a single point with balanced contact pressures for mechanically coupling said wheels to said wireline in substantially the same manner to rotate said wheels with movement of said wireline,
   means for pivotally supporting said slidable mounts and said carriages on said chassis and aligning the rotational plane of said wheels to include the path of said wireline at said point, said slidably mounted carriages, biasing means and pivotal support means cooperating to yield to unbalanced lateral forces exerted on one of said wheels and maintain said coupling of said wheels to said wireline, and low torque-load signal generators each responsive to the rotation of one wheel for generating said independent signals each of said signals corresponding to said wireline movement at generally the same point on said wireline and presumably corresponding to the same movement of said wireline under ideal measurement conditions; and means for automatically utilizing said signals to provide a repeatable signal representative of said wireline movement when wireline measurement conditions are less than ideal.

2. The apparatus of claim 1 wherein said utilizing comprises comparing said independent signals and if said signals compare within a small percentage averaging said signals to provide said repeatable signal and if said signals do not compare within said small percentage, selecting the signal corresponding to the more rapidly rotating of said wheels as said repeatable signal.

3. The apparatus of claim 2 wherein said comparing comprises determining which of said wheels appears to be the less rapidly rotating wheel, and providing an indication of which wheel is said less rapidly rotating wheel.

4. Apparatus for providing a repeatable signal representative of bidrectional movement of a wireline used for lowering and raising a borehole tool in a borehole in a borehole under varying wireline measurement conditions, said signal being suitable for driving a depth recorder for repeatable depth recording measurements from said borehole tool, comprising:

substantially identical wireline measurement wheels disposed in a generally horizontal plane on opposite sides of said wireline and equally biased to slide toward one another to tangentially couple said wheels to said wireline in substantially the same manner during said bidirectional movement and at the same point on said wireline for rotation of said wheels with movement of said wireline, the rotation of each wheel corresponding to the movement of said wireline at said point under ideal wireline measurement conditions;

signal generators each responsive to the rotation of one wheel for generating independent signals corresponding to said rotation; and means for utilizing said independent signals by comparing said signals to determine which of said wheels appears to be the more rapidly rotating wheel and which appears to be less rapidly indicating operation under less than ideal conditions, and selecting the signal corresponding to the more rapidly rotating wheel as said repeatable signal.

5. The apparatus of claim 4 wherein said utilizing further comprises providing an indication of which wheel is less rapidly rotating to warn of said less than ideal operating conditions of said wheel.

6. The apparatus of claim 4 wherein said utilizing comprises comparing said independent signals and if said signals compare within a small percentage, indicating said wheels are operating under substantially the same conditions, averaging said signals to provide said repeatable signal.

7. The apparatus of claim 4 wherein said utilizing comprises comparing said independent signals and if said signals compare within a small percentage, averaging said signals to provide said repeatable signal, and if said signals do not compare within said small percentage, selecting the signal corresponding to the most rapidly rotating wheel as said repeatable signal.

8. The apparatus of claim 7 wherein said utilizing further comprises providing an indication of which wheel is said more rapidly rotating wheel.

9. The apparatus of claim 8 wherein said wheels rotate in a generally horizontal plane so as to be free from variations in wheel-to-wireline contact pressure due to wheel weight and vertical acceleration and variations in side-to-side lengths in said wireline and variations in contact area due to curvature in the vertical plane of the path of said wireline movement in said generally horizontal section.

10. The apparatus of claim 8 wherein said wheels are rotatably supported in carriages slidably mounted on opposite sides of a chassis, said slidable mounts providing a slidable movement of said carriages along two substantially parallel lines transverse to the direction of said wireline movement, said rotation being in a plane generally parallel to a plane including said two parallel lines; and means for pivotally supporting said slidable mounts and said carriages on said chassis and aligning the rotational plane of said wheels to include the path of said wireline at said point, said slidably mounted carriages, equally biased wheels and pivotal support means cooperating to yield to unbalanced lateral forces exerted on one of said wheels.

11. Method of providing a repeatable signal representative of movement of a wireline used for lowering and raising a borehole tool in a borehole under varying wireline measurement conditions, said signal being suitable for driving a depth recorder for repeatable depth recording measurements from said borehole tool; comprising:

producing independent signals, each corresponding to the rotation of substantially identical wireline measurement wheels disposed on opposite sides of said wireline for rotation in a generally horizontal plane and equally biased to slide towards one another in said plane to tangentially couple said wheels to said wireline in substantially the same manner at the same point during the lowering and raising of said borehole tool, said signals each corresponding to the movement of said wireline under ideal measurement conditions; and automatically processing said signals to provide a repeatable signal representative of said wireline movement under varying wireline measurement conditions.

12. The method of claim 11 wherein said processing comprises comparing said independent signals and if said signals compare within a small percentage, indicating both of said wheels are operating under substantially the same conditions, averaging said signals to provide said signals to provide said repeatable signal.

13. The method of claim 11 wherein said comparing comprises comparing said signals and if said signals compare within a small percentage averaging said signals to provide said repeatable signal and if said signals do not compare within said small percentage, selecting the signal corresponding to the more rapidly rotating of said two wheels as said repeatable signal.

14. The method of claim 11 wherein said processing comprises determining which of said wheels appears to be the more rapidly rotating wheel and which appears to be the less rapidly rotating, and providing an indication of which wheel is said more rapidly rotating wheel and which wheel is less rapidly rotating.

15. Apparatus for repeatably measuring bidirectional movement of wireline while guiding said wireline to and from a spool during logging of a borehole and adapted for attachment to a spooling arm fixed to a base on one end and including vertical guides on the other end for exerting lateral forces on said wireline transmitted from said base for spooling said wireline, said apparatus comprising:

chassis adapted for attachment to the guide end of said arm in a generally horizontal section of said wireline to prevent rotation about the longitudinal dimension of said wireline while swivelling at said vertical guides in both lateral and vertical planes;

guiding assemblies attached to said chassis for guiding said chassis along said horizontal section during movement of said wireline;

support means comprising carriages on slidable mounts on opposite sides of said chassis, said mounts providing a slidable movement of said carriages along two substantially parallel lines generally transverse to the direction of said wireline movement;

measurement wheels rotatably supported in said carriages, said rotation being in a plane generally parallel to a plane including said two parallel lines;

means attached to said carriages for equally biasing said wheels on opposite sides of said chassis to slide towards each other and tangentially engaging the sides of said wireline with equal pressure during said bidirectional movement for mechanically coupling said wireline movement to rotate said wheels;

means for pivotally supporting said slidable mounts and said carriages on said chassis and aligning said rotational plane of said wheels to include the path of said wireline at said point, said slidably mounted carriages, biasing means and pivotal support means cooperating to yield to lateral forces exerted on said chassis which might otherwise be exerted on one of said wheels and thereby preventing said lateral forces from being transferred to said wheels; and means attached to at least one of said wheels for generating electrical signals corresponding to the rotation of said one wheel.

16. The apparatus of claim 15 wherein said wheels rotating in substantially the same plane and on opposite sides of said wireline are substantially identical, and said generating includes means each responsive to the rotation of one substantially identical wheel for generating an independent signal corresponding to the rotation.

17. The apparatus of claim 16 and further comprising means for utilizing said independent signals to provide a repeatable signal representative of said movement of said wireline.

18. The apparatus of claim 17 and further comprising means for comparing said signals to determine which of said wheels appears to be the more rapidly rotating of said wheels and selecting the signal corresponding to the more rapidly rotating wheel as said repeatable signal.

19. The apparatus of claim 18 and further means for providing an indication of which of said wheels is the less rapidly rotating wheel.

20. The apparatus of claim 16 and further comprising means for comparing said independent signals and if said signals compare within a small percentage, indicating both of said wheels are operating under substantially the same wireline measurement conditions, averaging said signals to provide said repeatable signal.

21. The apparatus of claim 20 wherein said comparing comprises determining which of said wheels appears to be the more rapidly rotating wheel and which appears to be the less rapidly rotating wheel, and providing an indication of which wheel is said more rapidly rotating wheel and which wheel is said less rapidly rotating wheel.

22. The apparatus of claim 16 and further comprising means for comparing said separate signals and if said signals compare within a small percentage averaging said signals to provide said repeatable signal and if said signals do not compare within said small percentage, selecting the signal corresponding to the more rapidly rotating of said wheels as said repeatable signal.

23. Apparatus for providing a signal representative of movement of a wireline used in logging a borehole under varying wireline measurement conditions for recording measurements from a borehole tool lowered in said borehole on said wireline, comprising:

means for generating a series of electrical pulse signals corresponding to rotation of a wireline measurement wheel tangentially coupled to said wireline for rotation of said wheel, said wheel having a circumference differing from a standard calibration circumference by a predetermined factor; said factor expressed as N pulses for each given number of generated pulses, said given number having a magnitude several factors of ten larger than N, with N being a small integer number other than one;

means for automatically correcting said signals for said factor and providing a corrected series of electrical pulse signals corresponding to said standard calibration circumference; and means for automatically utilizing said corrected signals to provide a signal suitable for driving a recorder for recording measurements from said borehole tool in correspondence with borehole depths of said tool.

24. The apparatus of claim 23 wherein said means for automatically correcting comprises:

a first counter adapted for counting said electrical pulse signals and outputting one pulse for every $10^{P1}$ pulses, said one pulse enabling the input of N pulses to a second counter adapted for counting said N pulses and outputting one pulse for every $10^{P2}$ pulses, where P2 corresponds to the number of digits defining N and where P1 corresponds to n−P2 with n being related to the number of digits defining said given number.

25. Apparatus for providing a signal representative of movement of a wireline used in logging a borehole under varying wireline measurement conditions for recording measurements from borehole tool lowered in said borehole on said wireline, comprising:

means for generating a series of electrical pulse signals corresponding to rotation of a wireline measurement wheel tangentially coupled to said wireline for rotation of said wheel, said wheel having a circumference differing from a standard calibration circumference such that said generated series of electrical pulse signals require multiplication by a predetermined factor for correction to said standard calibration circumference, said factor differing from unity by a small number requiring scaling by n powers of 10 to form an integer number N;

means for automatically correcting said signals and providing a corrected series of electrical pulse signals corresponding to said calibrated circumference, said means comprising a first counter adapted for counting said electrical pulse signals and outputting one pulse for every $10^{P1}$ pulse, said one pulse enabling the output of N pulses to a second counter adapted for counting said N pulses and outputting one pulse for every $10^{P2}$ pulses, where P2 corresponds to the number of digits defining N and where P1 corresponds to $n-P2$ with n being related to said required scaling by powers of 10 to form N; and means for automatically utilizing said corrected signals to provide a signal suitable for driving a recorder for recording measurements from said borehole tool in correspondence with borehole depths of said tool.

26. Apparatus for detecting longitudinal displacement of a wireline comprising:

a chassis having attachment means for attaching said chassis to prevent movement thereof in a direction parallel to longitudinal displacements of said wireline and rotation around said wireline;

first and second guiding means spaced apart along an axis of said chassis and adapted to engage first and second sections of said wireline respectively for transversely guiding said chassis relative to the wireline while allowing longitudinal displacements of said wireline in a direction parallel to said axis;

first and second wheels on either side of said axis respectively for tangentially engaging opposite generally vertical sides of said wireline;

support means for supporting said first and second wheels on said chassis and adapted for allowing said wheels to slide towards each other in a direction perpendicular to said axis of said chassis;

means for biasing said first and second wheels to slide towards each other on said support means, whereby the pressure of said wheels on said wireline remains balanced and substantially independent of transverse displacements of said wireline; and means responsive to the rotation of at least one of said wheels for producing indications of the longitudinal displacements of the wireline.

27. Apparatus for detecting longitudinal displacement of a wireline comprising:

a chassis having attachment means for attaching said chassis to prevent movement thereof in a direction parallel to longitudinal displacements of said wireline and rotation about said wireline;

first and second guiding means spaced apart along an axis of said chassis and adapted to engage first and second sections of said wireline respectively for transversely guiding said chassis relative to the wireline while allowing longitudinal displacements of said wireline in a direction parallel to said axis;

first and second wheels on either side of said axis respectively for tangentially engaging opposite vertical sides of said wireline;

support means for supporting said first and second wheels on said chassis and adapted for allowing said wheels to slide towards each other in a direction perpendicular to said axis of said chassis, whereby the pressure of said wheels on said wireline remains substantially independent of transverse displacement of said wireline; and means responsive to the rotation of at least one of said wheels for producing indications of the longitudinal displacements of the wireline.

28. Apparatus for providing a repeatable signal representative of bidirectional movement of a wireline used in logging boreholes and suitable for driving a recorder under varying wireline measurement conditions for depth recording measurements from a borehole tool lowered in said borehole on said wireline, comprising:

means for producing independent signals, each corresponding to said bidirectional wireline movement at generally the same point on said wireline, said producing means comprising substantially identical wireline measurement wheels disposed on opposite vertical sides of said wireline, said wheels being equally biased to slide towards one another in a generally horizontal plane to tangentially couple said wireline in substantially the same manner at said point during the raising and lowering of a borehole tool for rotation of said wheels with movement of said wireline, each of said independent signals presumably corresponding to the same movement of said wireline under ideal measurement conditions; and means for automatically utilizing said independent signals to provide a repeatable signal representative of said wireline movement when wireline measurement conditions are less than ideal.

* * * * *